United States Patent [19]
Sato

[11] Patent Number: 5,943,517
[45] Date of Patent: Aug. 24, 1999

[54] ELECTRO-DEVELOPING TYPE STILL VIDEO CAMERA USING ELECTRO-DEVELOPING RECORDING MEDIUM AND HAVING MEMORY-MEDIUM FOR STORING IMAGE DATA READ THEREFROM

[75] Inventor: Koichi Sato, Tokyo, Japan

[73] Assignee: Asahi Kogaku Kogyo Kabushiki Kaisha, Tokyo, Japan

[21] Appl. No.: 08/802,838

[22] Filed: Feb. 18, 1997

[30] Foreign Application Priority Data

Feb. 15, 1996 [JP] Japan ................................ 8-052279

[51] Int. Cl.⁶ ............................................. G03B 17/48
[52] U.S. Cl. ............................................. 396/429; 430/21
[58] Field of Search ..................... 396/30, 429; 348/231, 348/232, 233, 552; 369/47, 52, 53, 54; 430/21

[56] References Cited

U.S. PATENT DOCUMENTS

| | | | |
|---|---|---|---|
| 4,760,526 | 7/1988 | Takeda et al. ........................ | 364/300 |
| 4,910,604 | 3/1990 | Takei et al. .......................... | 358/310 |
| 5,291,463 | 3/1994 | Ichikawa et al. .................... | 369/13 |
| 5,424,156 | 6/1995 | Aoki et al. . | |
| 5,561,531 | 10/1996 | Funazaki ............................. | 386/95 |
| 5,563,396 | 10/1996 | Wakui . | |
| 5,684,768 | 11/1997 | Terasaki et al. ..................... | 369/47 |
| 5,854,875 | 12/1998 | Yamagishi ........................... | 386/120 |

FOREIGN PATENT DOCUMENTS 5-2280   1/1993   Japan .

*Primary Examiner*—Safet Metjahic
*Assistant Examiner*—John Chizmar
*Attorney, Agent, or Firm*—Greenblum & Bernstein P.L.C.

[57] ABSTRACT

An electro-developing type still video camera which uses an electro-developing recording medium, has an image-sensor which optically and electronically senses a developed image as a single-frame of image data from the medium. Also included is a memory device having a plurality of data-storage sections, in one of which the single-frame of image data can be stored whenever the developed image of the medium is sensed. A first image-data transferring device transfers a single-frame of image data from a selected one of the sections of the memory device to an external processing device when such a single-frame of image data is stored in the selected section. A second image-data transferring device transfers a single-frame of image data sensed by the image-reader to the external processing device when a single-frame of image data is not stored in the selected section.

28 Claims, 18 Drawing Sheets

ELECTRO-DEVELOPING TYPE STILL VIDEO CAMERA USING ELECTRO-DEVELOPING RECORDING MEDIUM AND HAVING MEMORY-MEDIUM FOR STORING IMAGE DATA READ THEREFROM

BACKGROUND OF THE INVENTION

1. Field of the Invention

The present invention relates to an electro-developing type video camera using an electro-developing recording medium in which an optical image obtained through a photographing lens system is electronically and directly recorded and developed as a visible image as soon as the optical image is formed on the recording medium. More particularly, the present invention relates to such an electro-developing type video camera which is provided as an electronic still video camera.

2. Description of the Related Art

Conventionally, a silver halide photographic material is generally used the material for recording an optical image obtained through a photographing lens system. Silver halide photographic materials are excellent for their high optical sensitivity, high resolution, and economic efficiency. However, silver halide materials have drawbacks in that not only is the developing process cumbersome but also a visible image cannot be obtained at the time of photographing. A dry-type developing method has been developed to simplify the developing process. However, simultaneous development in which a visible image is obtained upon photography is impossible in the dry-type developing method.

On the other hand, as non-silver-halide photographic materials, there are known electrophotographic materials, diazo-type photographic material and free-radical photographic materials and so on. However, these materials do not have the advantageous characteristics of the silver halide photographic material, but are able to simultaneously develop and keep a visible image.

Recently, a photographic material has been developed, in which an optical image can be electronically and directly recorded and developed as a visible image as soon as the optical image is formed on the recording medium. The developed image is similar to a silver halide photographic material image. A recording medium formed of such a photographic material, in which a visible image is electronically and directly recorded and developed, is referred to as an electro-developing recording medium hereinafter.

For example, Japanese Unexamined Patent Publication No. 5-2280 and U.S. Pat. No. 5,424,156 disclose one type of electro-developing recording medium comprising an electrostatic information recording medium and an electric charge keeping medium. The electrostatic information recording medium includes a photoconducting layer and an inorganic oxide material layer, and the electric charge keeping medium includes a liquid crystal display, both media being combined to face each other with a small gap therebetween.

A voltage is applied between the electrostatic information recording medium and the electric charge keeping medium, and an optical image is formed on the electrostatic information recording medium during the application of the voltage. An electric charge distribution is produced over the electrostatic information recording medium in accordance with a light intensity distribution of the optical image, so that the intensity of an electric field acts on the liquid crystal of the electric charge keeping medium in accordance with electric charge distribution. Thus, an image derived from the optical image is reproduced in the electric charge keeping medium as a visible image. Namely, as soon as the optical image is formed on the electrostatic information recording medium, the image is developed in the electric charge keeping medium.

When the electric charge keeping medium is comprised as a memory-type liquid crystal display using, for example, a smectic liquid crystal, the developed visible image can be retained even if the electric field is eliminated from the electro-developing recording medium. In this case, the electro-developing recording medium carrying the developed visible image can be preserved in the same way as slides or transparency sheet films.

A camera using the electro-developing recording medium is referred to as an electro-developing type camera hereinafter, and this electro-developing type camera may be constituted as an electronic still video camera. The electro-developing type still video camera is provided with an image-reader for reading optically and electronically an developed image on the electro-developing recording medium, and an memory device for storing an image data read therefrom.

The image-reader includes a solid-state image-sensor such as a CCD image-sensor. This image-sensor can constituted as a line image-sensor, because a frame of developed image of the electro-developing recording medium can be read by scanning a recording area thereof with the line image-sensor. Note, a conventional electronic still video camera must be provided with an area type image-sensor on which an optical image is focussed through a photographing lens system. The memory device for storing the read image data is constituted as a memory-medium driver for driving a memory-medium such as an IC memory card, a floppy disk, a detachable hard disk or the like. Namely, in the electro-developing type camera constituted as the still video camera, the developed image of the electro-developing recording medium is converted into the image data by the line image-sensor, and the converted image data is stored in the memory-medium of the memory-medium driver.

The electro-developing type still video camera can be connected to an external image data processing device such as a personal computer to transfer the image data from the camera to the personal computer, so that the image data is processed and reproduced on a TV monitor connected to the personal computer. Also, in order for the reproduction of the image data on the TV monitor, the memory-medium discharged from the memory-medium driver of the camera may be loaded in a memory-medium driver provided in the personal computer.

In either case, the memory-medium must be formatted such that a memory area of the memory-medium is sectioned into a plurality of data-storage sections or files in accordance with an operating system (OS) used in the personal computer, and the image data derived from the developed image of the electro-developing recording medium is stored in one of the data-storage sections or files.

When the memory-medium is used in either the electro-developing type still video camera or the personal computer, information data other than image data may be stored in individual files of the memory-medium. Also, there may be a case where an image data is not stored in any one of the files of the memory-medium after executing a photographing operation. For example, at a time prior to a reading-operation of a developed image from the electro-developing recording medium, when the memory-medium does not have image data stored therein and is loaded in the memory-medium driver of the camera, or the memory-medium is exchanged with a new one.

When the personal computer requests the camera to transfer the image data thereto, the camera cannot respond to the transfer demand of the image data to the personal computer, even if the electro-developing recording medium has the developed image recorded thereon.

SUMMARY OF THE INVENTION

Therefore, an object of the present invention is to provide an electro-developing type still video camera as mentioned above, in which the frequency of transfer of image data from the camera to an external processing device such as a personal computer can be maximized, upon the transfer request of image data by the external processing device.

In accordance with an aspect of the present invention, there is provided an electro-developing type still video camera using an electro-developing recording medium loaded which comprises an image-sensor for sensing optically and electronically a developed image as a single-frame of image data from the electro-developing recording medium, and a memory device having a plurality of data-storage sections. The single-frame of image data is stored in any one of the data-storage sections of the memory device upon sensing the developed image of the electro-developing recording medium by the image-sensor. The still video camera also includes a receiver for receiving a command signal from an external processing device for demanding a transfer of image data from a selected one of the data-storage sections of the memory device, a first image-data transferrer for transferring a single-frame of image data from the selected data-storage section of the memory device when such a single-image of data is stored in the selected data-storage section of the memory device, and a second image-data transferrer for transferring a single-frame of image data sensed by the image-sensor to the external processing device when no image data is stored in the selected data-storage section of the memory device.

The electro-developing type still video camera also may comprise a determiner for determining whether the electro-developing recording medium has been recorded when loaded into the still video camera. Preferably, the determiner comprises a transparency-sensor for sensing a change of transparency of the electro-developing recording medium to determine whether the electro-developing recording medium has been recorded.

Further, the electro-developing type still video camera may comprise a detector for detecting whether the electro-developing recording medium is loaded therein or unloaded therefrom before the determination operation of the determiner. Furthermore, the electro-developing type still video camera may further comprise a selector for selecting another of the data-storage sections of the memory device for responding to the demand of the transfer of image data when the image data is not stored in the first-mentioned selected data-storage section.

In accordance with another aspect of the present invention, there is provided an electro-developing type still video camera using an electro-developing recording medium which comprises an image-sensor for sensing optically and electronically a developed image as a single-frame of image data from the electro-developing recording medium, and a memory device having a plurality of data-storage sections. The single-frame of image data is stored in any one of the data-storage sections of the memory device upon sensing the developed image of the electro-developing recording medium by the image-sensor. The still video camera further includes an actuating switch for actuating the image-sensor to execute the optical and electronical sensing of the developed image of the electro-developing recording medium by turning the actuating switch ON, a receiver for receiving a command signal from an external processing device for demanding a transfer of image data from a selected data-storage section of the memory device, and an actuator for actuating the image-sensor to execute the optical and electronical sensing of the developed image of the electro-developing recording medium when the receiver receives the command signal from the external processing device and when no data is stored in the selected data-storage section of the memory device.

In accordance with yet another aspect of the present invention, there is provided an electro-developing type still video camera using an electro-developing recording medium which comprises an image-sensor for sensing optically and electronically a developed image, as a single-frame of image data from the electro-developing recording medium, and a memory device having a plurality of data-storage sections. The single-frame of image data is stored in any one of the data-storage sections of the memory device upon sensing the developed image of the electro-developing recording medium by the image-sensor. The still video camera also includes a receiver for receiving a command signal from an external processing device for demanding a transfer of image data from a selected data-storage section of the memory device, and a selector for selecting another of the data-storage sections of the memory device for responding to the demand of the transfer of image data when data stored in the selected data-storage section of the memory device is not an image data.

In accordance with yet another aspect of the present invention, there is provided an electro-developing type still video camera using an electro-developing recording medium which comprises an image-sensor for sensing optically and electronically a developed image, as a single-frame of image data from the electro-developing recording medium, and a memory device having a plurality of data-storage sections. The single-frame of image data being enabled to be stored in any one of the data-storage sections of the memory device upon sensing the developed image of the electro-developing recording medium by the image-sensor. The still video camera also includes a receiver for receiving a command signal from an external processing device for demanding a transfer of image data from a selected data-storage section of the memory device, a determiner for determining whether or not data stored in the selected data-storage section of the memory device is image data, an image-data-transferrer for transferring the image data from the selected data-storage section of the memory device to the external processing device when the determiner has determined that the data stored in the selected data-storage section of the memory device is image data, and a selector for selecting another of the data-storage sections of the memory device for responding to the transfer of image date when the determiner has determined that the data stored in the selected data-storage section of the memory device is not an image data.

BRIEF DESCRIPTION OF THE DRAWINGS

The object and other objects of the present invention will be better understood from the following description, with reference to the accompanying drawings in which:

FIG. 6 is a conceptual view showing a format of a memory-medium such as an IC card, a floppy disk, a detachable hard disk or the like;

DESCRIPTION OF THE PREFERRED EMBODIMENTS

Figure 1:
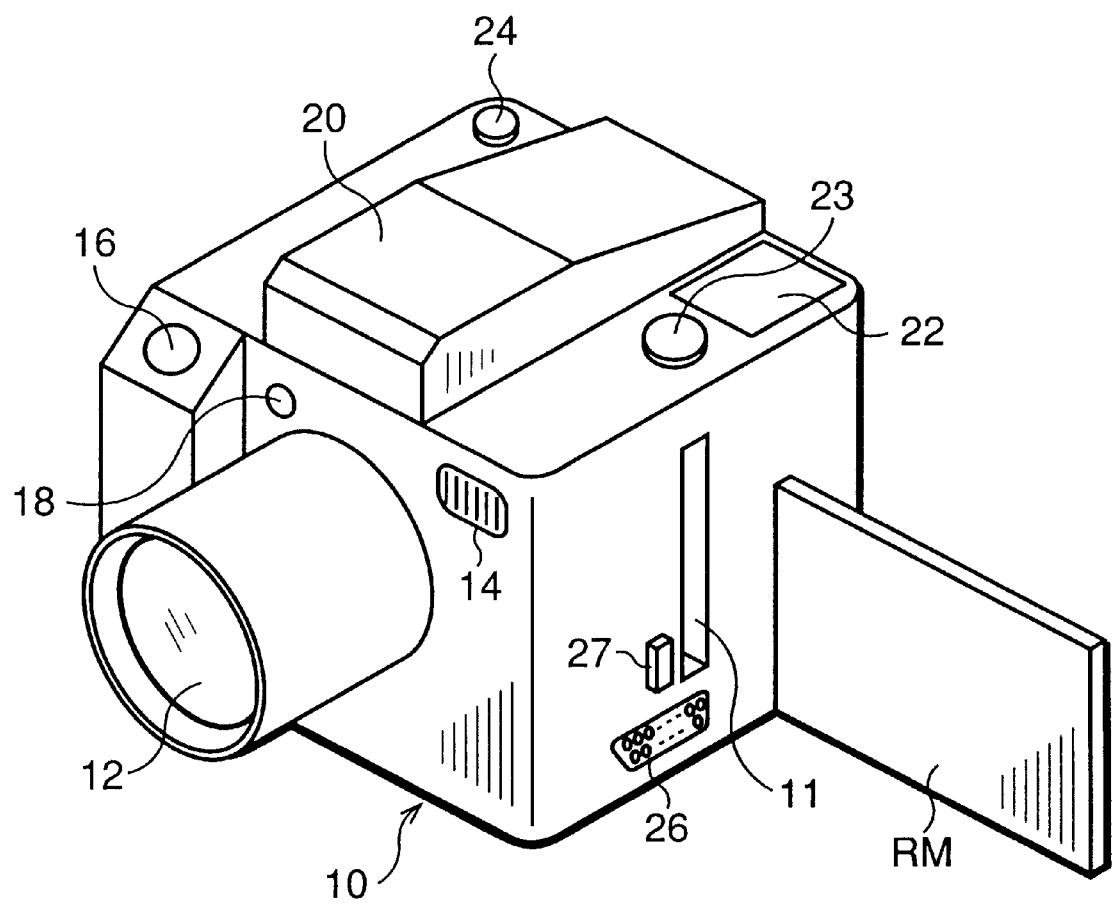
FIG. 1 is an external schematic perspective view showing an electro-developing type still video camera using an electro-developing recording medium, to which the present invention is applied.

FIG. 1 is an external view of an electro-developing type camera to which a first embodiment of the present invention is applied. The camera comprises a camera body 10 having a slot 11 formed in a side wall thereof, and an electro-developing recording medium RM is loaded and unloaded in the camera through the elongated slot 11.

When viewing the camera body 10 from the front side thereof, a photographing optical system 12 is provided approximately at the center portion of the front surface of the camera body 10, and an electronic flash 14 is disposed on the front surface of the camera body 10 above and to the right side of and the photographing optical system 12. A release switch (RS) 16 and a photometry sensor 18 are provided on the front, on the opposite side of the photographing optical system 12 relative to the electronic flash 14.

On the top surface of the camera body 10, a viewfinder 20 is centrally provided. An LCD (liquid crystal display) panel 22 and a scan start switch (SS) 23 are provided on the top surface, on one side of the viewfinder 20, and a main switch 24 is provided on the other side of the viewfinder 20. Further, an output terminal connector 26 is provided in the side wall of the camera, in which the slot 11 is formed, so that an image signal obtained by the camera can be transferred to an external display device such as a TV monitor or an external processing device such as a personal computer.

Note, in FIG. 1, reference numeral 27 indicates a button for ejecting and unloading the electro-developing recording medium from the camera through the slot 11.

Figure 2:
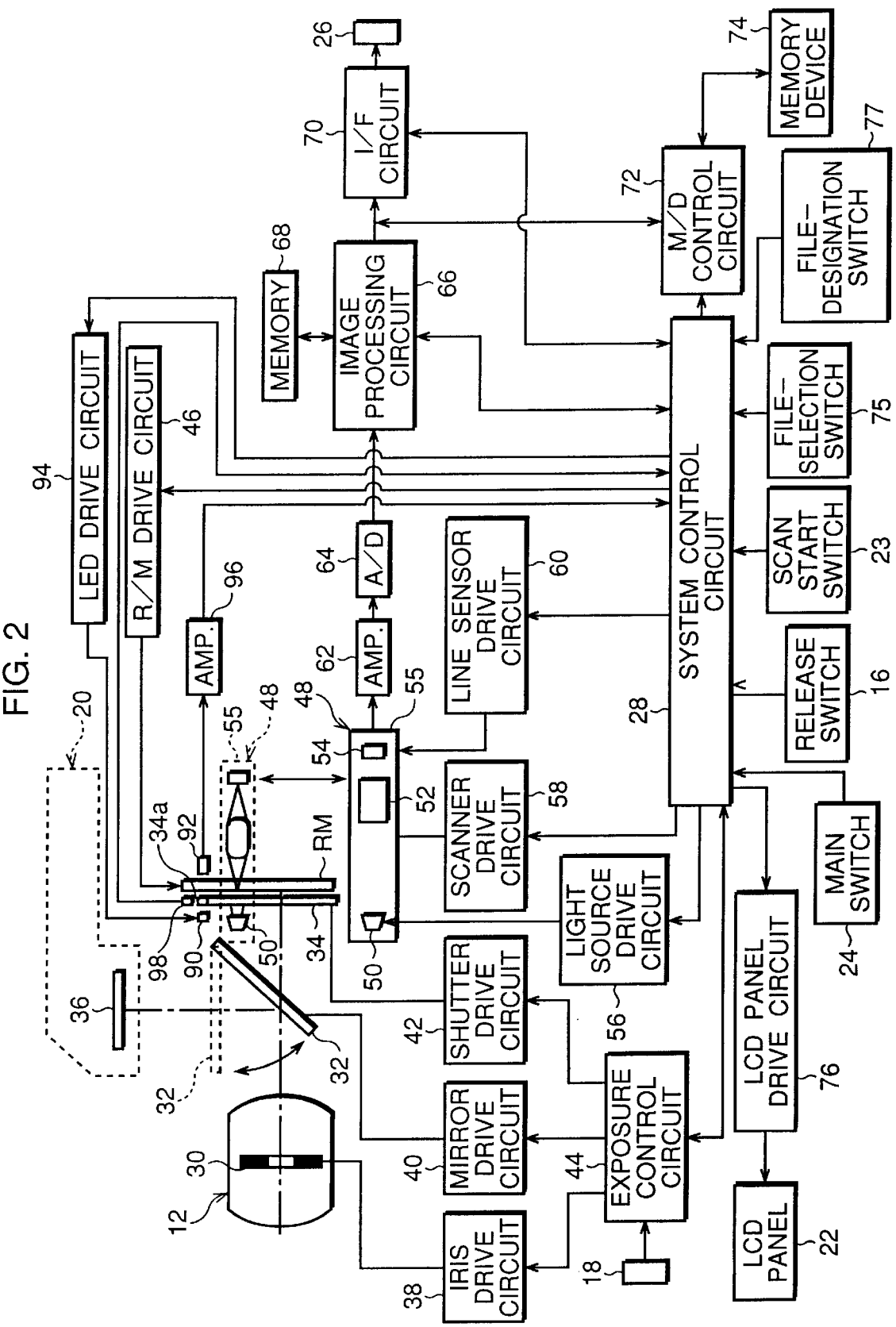
FIG. 2 is a block diagram of the electro-developing type still video camera shown in FIG. 1.

FIG. 2 shows a block diagram of a first embodiment of the electro-developing type still video camera according to the present invention. A system control circuit 28, which includes a microcomputer or microprocessor, a read-only memory (ROM), and a random-access-memory (RAM), etc., is provided to control the electro-developing type camera as a whole.

The photographing optical system 12 has a plurality of lens groups and an aperture or diaphragm 30. The electro-developing recording medium RM loaded through the slot 11 is disposed behind the photographing optical system 12. A quick return mirror 32 is placed between the photographing optical system 12 and the electro-developing recording medium RM, and a shutter 34 is placed between the quick return mirror 32 and the electro-developing recording medium RM. A focusing glass 36 included in a viewfinder optical system of the viewfinder 20 is disposed above the quick return mirror 32.

The diaphragm 30, the quick return mirror 32 and the shutter 34 are driven by an iris drive circuit 38, a mirror drive circuit 40, and a shutter drive circuit 42, respectively, and these drive circuits 38, 40, and 42 are controlled by an exposure control circuit 44 which is operated in accordance with a command signal outputted by the system control circuit 28.

During an exposure, the size of the diaphragm 30 is adjusted by the iris drive circuit 38 under control of the exposure control circuit 44 based on an output signal of the photometry sensor 18.

The quick return mirror 32 is usually in a down-position (the inclined position shown by the solid lines in FIG. 2), and light beams passing through the photographing optical system 12 are directed to the optical system of the viewfinder 20, so that an object to be photographed can be observed through the viewfinder 20 by a photographer. When a photographing operation is executed, the quick return mirror 32 is rotated upward by the mirror drive circuit 40, and is then in an up-position (the horizontal position shown by the broken lines in FIG. 2), so that the light beams are directed to the shutter 34.

The shutter 34 is usually closed, however, when taking a photograph, the shutter 34 is opened for a predetermined period of time by the shutter drive circuit 42 under the control of the exposure control circuit 44. Thus, during the photographing operation, the light beams, passing through the photographing optical system 12 and the shutter 34, are directed to a light receiving surface of the electro-developing recording medium RM. Namely, by rotating the quick return mirror 42 from the down position to the up-position, and by opening the shutter 34, an optical image to be photographed by the photographing optical system 12 is focussed and formed on the light receiving surface of the electro-developing recording medium RM.

A voltage is applied to the electro-developing recording medium RM under control of a recording medium drive circuit 46 which is operated in accordance with a command signal outputted by the system control circuit 28. By exposing the electro-developing recording medium RM while applying the voltage, the optical image obtained by the photographing optical system 12 is developed in the electro-developing recording medium RM as a visible image.

An image-reader or scanning mechanism 48 is provided in the camera body 10 close to the electro-developing recording medium RM loaded therein, and executes a scanning operation for reading optically and electronically the developed image of the electro-developing recording medium RM. The scanning mechanism 48 comprises a linear light source 50, a scanner optical system 52, and a line image-sensor 54 which are supported by a carriage member 55, and all of which are aligned with each other.

The linear light source 50 is positioned in front of the shutter 34 and the electro-developing recording medium RM, and includes an LED (light emitting diode) array having a plurality of light emitting diodes aligned with each other, and a collimating lens for converting the light rays emitted therefrom, into parallel light rays. These elements are aligned with each other to form a linear light emitting surface.

The scanner optical system 52 and the line image-sensor 54 are positioned behind the electro-developing recording medium RM. The line image-sensor 54 is constructed as a one-dimensional CCD sensor having, for example, 2,000 pixel elements which form a linear light receiving surface. The parallel light rays emitted from the linear light source 50 are focussed on the linear light receiving surface of the line image-sensor 54 by the scanner optical system 52.

The carriage member 55, by which the linear light source 50, the scanner optical system 52, and the line image-sensor 54 are supported, is movable between a lower position shown by a solid line in FIG. 2 and an upper position shown by a broken line in FIG. 2, and a movement of the carriage member 55 is carried out by a drive motor (not shown) such as a stepping motor, a servo motor, or the like.

When the scanning operation or reading operation of the developed image from the electro-developing recording medium RM is executed, the shutter 34 is opened, and the linear light source 50 is turned ON. Then, the carriage member 55, which supports the scanning mechanism 48, is moved from the lower position (solid lines) to a scan start position, and is further moved intermittently from the scan start position toward the upper position (broken lines). Thus, the electro-developing recording medium RM is scanned with the light rays emitted from the linear light source 50 during the intermittent movement of the scanning mechanism 48.

During the scanning operation, the light rays passing through the electro-developing recording medium RM, i.e., the light rays carrying the image information of the developed image, are focussed on the light receiving surface of the line image-sensor 54 by the scanner optical system 52. The line image-sensor 54 serves as a photoelectric-conversion device for sensing and converting the optical image information into electrical image pixel signals. Of course, the light source 50 and the line image-sensor 54 are of suitable length to completely cover and extended over a width of a recording area of the electro-developing recording medium RM. The electrical image pixel signals are read out from the line image-sensor 54 during a movement of the scanning mechanism 48 between the two adjacent scanning steps.

Control of the light source 50 is performed by a light source drive circuit 56 (e.g., turning the light source 50 ON and OFF). The intermittent movement of the scanning mechanism 48 is carried out by driving the drive motor for the carriage member 55 under control of a scanner drive circuit 58. The reading-scan of the image pixel signals from the line image-sensor 54 is controlled by a line sensor drive circuit 60. These drive circuits 56, 58, and 60 are controlled by the system control circuit 24.

The image pixel signals read-out from the line image-sensor 54 are amplified by an amplifier 62, and are then converted to digital image data by an analog-to-digital (A/D) converter 64. The digital image data are subjected to a shading correction, a gamma correction, and so on by an image processing circuit 66 under control of the system control circuit 24, and are then temporarily stored in a memory 68 which may include an EEPROM having correction data for the shading correction. Note, the memory 68 may have a capacity for storing a single-frame of digital image data obtained by a completion of the scanning operation of the scanning mechanism 48. The single-frame of digital image data is read out from the memory 68, if necessary.

For example, the digital image data read from the memory 68 may be optionally fed to an interface circuit 70 through the image processing circuit 66. In this case, the image data is subjected to a process such as a format-conversion process and so on in the interface circuit 70, and the processed image data is then transferred from the interface circuit 70 to, for example, an external TV monitor device (not shown) through the output terminal connector 17.

Also, the digital image data read from the memory 68 may be optionally fed to a memory device 74 through the memory drive control circuit 72. In this case, the image data is subjected to a process such as an image-compression processing, a format-conversion processing and so on in the memory device control circuit 72, and the processed image data is then stored in the memory device 74 which is constituted as a memory-medium driver for driving a memory-medium such as an IC memory card, a floppy disk, a detachable hard disk, or the like. Namely, in the memory device 74, the processed image data is written in and stored by the memory-medium.

The memory device or memory-medium driver 74 also has a function for reading the image data from the memory-medium. The read image data is fed to the interface circuit 70 through the memory device control circuit 72, and is then transferred from the interface circuit 70 to an external processing device such as a personal computer, if necessary.

The interface circuit 70 and the recording device control circuit 72 are operated in accordance with command signals outputted from the system control circuit 28.

Note, the memory-medium such as an IC memory card, a floppy disk, a detachable hard disk, or the like can be unloaded from the memory-medium driver 74, and may be then loaded in a memory-medium driver provided in the personal computer, if necessary, to directly read the image data from the loaded memory-medium for processing the read image data.

As shown in FIG. 2, the release switch 16 is connected to the system control circuit 28, and the photographing operation is executed by turning the release switch 16 ON. Also, the scan start switch 23 is connected to the system control circuit 28, and the scanning operation for reading the developed image from the electro-developing recording medium RM is executed by turning the scan start switch 23 ON. Further, the main switch 24 is connected to the system control circuit 28 to control ON and OFF settings of a main power source (not shown). Furthermore, the LCD panel 22 is connected to the system control circuit 24 through a liquid crystal drive circuit 76 to display various setting conditions of the electro-developing type camera, suitable messages, and so on.

Figure 3:
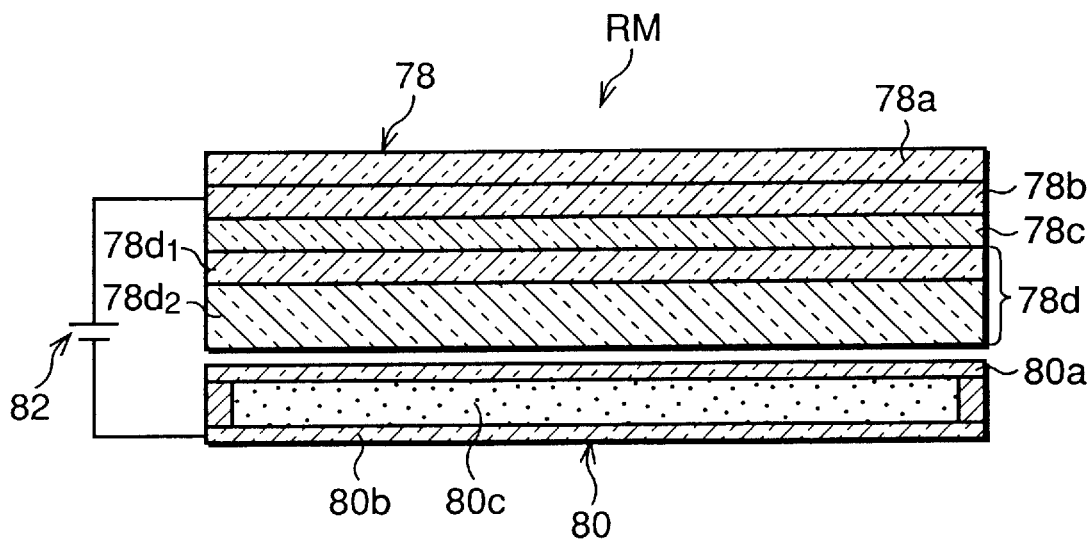
FIG. 3 is a cross sectional view showing a structure of the electro-developing recording medium.

FIG. 3 shows a structure of the electro-developing recording medium RM comprising an electrostatic information recording medium 78 and an electric charge keeping medium 80. A voltage is applied to the media 78 and 80 by an electric power source 82, illustrated symbolically in FIG. 3. The electric power source 82 forms a part of the recording medium drive circuit 46, and a recording medium activating signal (a voltage signal) is applied from the recording medium drive circuit 46 to the electro-developing recording medium RM during the photographing operation.

The electrostatic information recording medium 78 is formed by laminating a base plate 78a, an electrode layer 78b, an inorganic oxide material layer 78c and a photoconducting layer 78d. The photoconducting layer 78d is formed by laminating an electric charge generating layer $78d_1$ and an electric charge transferring layer $78d_2$.

The electric charge keeping medium 80 is constituted as a liquid crystal display which includes a liquid crystal supporting plate 80a, a liquid crystal electrode layer 80b, and a liquid crystal 80c intervened therebetween. Namely, the liquid crystal 80c is confined as a film-like layer between the supporting plate 80a and the electrode layer 80b.

In the example of the electro-developing recording medium RM shown in FIG. 3, the electric charge transferring layer $78d_2$ of the photoconducting layer 78d and the liquid crystal supporting plate 80a of the electric charge keeping medium 80 face each other with a small gap therebetween. Note, as is apparent from FIG. 3, the whole structure of the electrostatic information recording medium 78 is transparent.

When the electric power source 82 is turned ON, or when the recording medium drive circuit 46 is energized, the voltage signal or recording medium activating signal is applied between the recording mediums 78 and 80, i.e., between the electrode layer 78b and the liquid crystal electrode layer 80b.

When an optical image is formed on the electrostatic information recording medium 78 by the photographing optical system 12 during the application of the voltage signal, an electric charge distribution is produced over the electrostatic information recording medium 78 in accordance with a light intensity distribution of the optical image formed thereon, so that the intensity of an electric field, acting on the liquid crystal 80c of the electric charge keeping medium 80, is in accordance with the electric charge distribution.

Thus, the optical image obtained from the photographing optical system 12 is reproduced in the liquid crystal 80c as a visible image. Namely, as soon as the optical image is formed on the electrostatic information recording medium 78, the optical image is developed in the electric charge keeping medium 80.

As is already stated hereinbefore, when the liquid crystal 80c is of a memory-type, such as smectic liquid crystal, the developed image can be kept in the electro-developing recording medium RM even if the electric field is eliminated.

Of course, a contrast adjustment should be properly carried out such that the developed image can be obtained with an optimum contrast. In the electro-developing recording medium RM as mentioned above, the contrast control is performed in accordance with a time in which a voltage is applied to the electro-developing recording medium RM, as discussed below.

Figure 4:
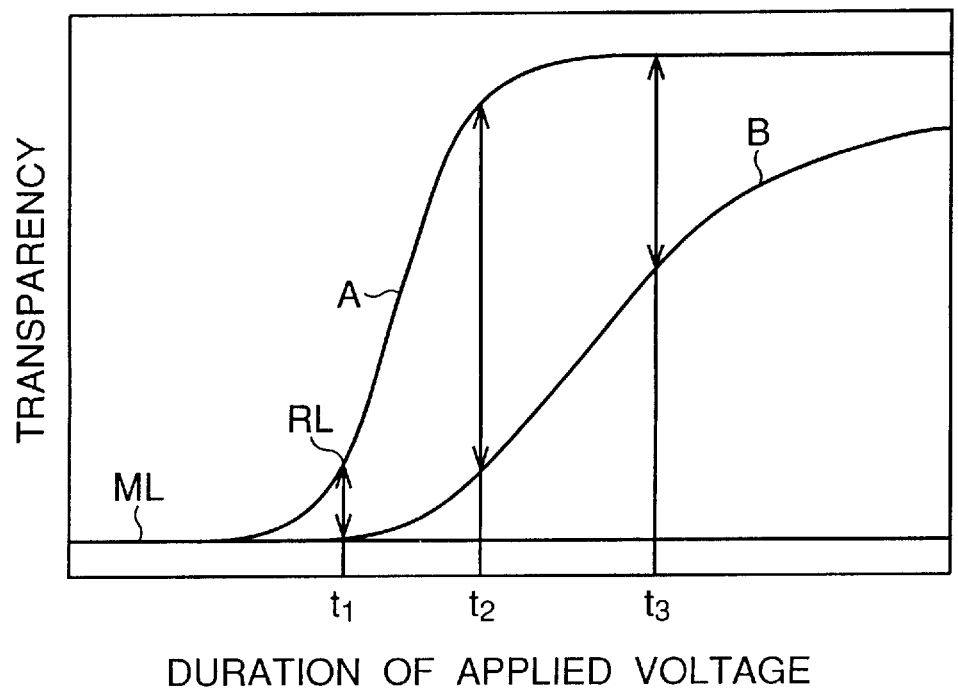
FIG. 4 is a graph showing characteristic curves of transparencies at light and dark zone images of an electric charge keeping medium of the electro-developing recording medium shown in FIG. 3, respectively.

For example, while a chart image, having white zones and black zones, is formed on the electrostatic information recording medium 78 of the electro-developing recording medium RM, and while each of the white zones and each of the black zones are developed as a light area of the image and a dark area of the image in the electric charge keeping medium or liquid crystal display 80 thereof, respectively, the transparencies of the light area of the image and the dark area of the image vary in accordance with a duration of the applied voltage to the electro-developing recording medium RM, as shown in a graph of FIG. 4.

Namely, in this graph, a characteristic curve A represents a change of the transparency of the light area of an image, and a characteristic curve B represents a change of the transparency of the dark area of an image. As is apparent from the graph, the characteristic curve A abruptly rises, whereas the characteristic curve B gradually rises, because an electrical resistance of a local portion of the electrostatic information recording medium 78 corresponding to the dark area of an image is not infinite, an electrical current can flow in that local portion to cause an gradual increase in transparency at the dark area of an image.

In short, an amount of electrical current flowing in the local portion of the medium 78 corresponding to the light area of an image is larger than that flowing in the other local portion of the medium 78 corresponding to the dark area of an image, so that the voltage applied to the light area of an image raises more rapidly in comparison with that to the dark area of an image. Thus, as shown in the graph of FIG. 4, the change of the transparency of the light area of an image (curve A) is more abrupt than that of the transparency of the dark area of an image (curve B).

A difference between the transparencies of the light and dark areas of an image represents a contrast of the image developed in the liquid crystal display 80 of the recording medium RM. As is apparent from the graph of FIG. 4, the application of voltage to the recording medium RM should be stopped at a time of $t_2$ so that the image can be developed with a maximum or optimum contrast. If the application of voltage to the recording medium RM is prematurely stopped at a time of $t_1$, for example, a contrast of the developed image is very small compared to $t_2$. On the other hand, when the application of voltage to the recording medium RM is stopped too late, as indicated by $t_3$, a contrast of the developed image is also smaller than at $t_2$.

Of course, a duration of the applied voltage from the recording medium drive circuit 46 to the recording medium RM is controlled such that an optical image obtained from the photographing optical system 12 can be developed in the recording medium RM with maximum or optimum contrast.

As is apparent from the foregoing, once the development of the image in the liquid crystal display 80 of the recording medium RM is carried out, a transparency of a light area of the developed image abruptly rises, as shown in the graph of FIG. 4. Accordingly, by detecting the change of the transparency of a light area of the recording medium RM, it is possible to determine whether the recording medium RM has been recorded. Also, a transparency of a dark area of the developed image is changed by the application of the voltage to the recording medium RM during the execution of the photographing operation. Thus, the change of the transparency of a dark area of the recording medium RM can be used to determine whether the recording medium RM has been recorded.

Figure 5:
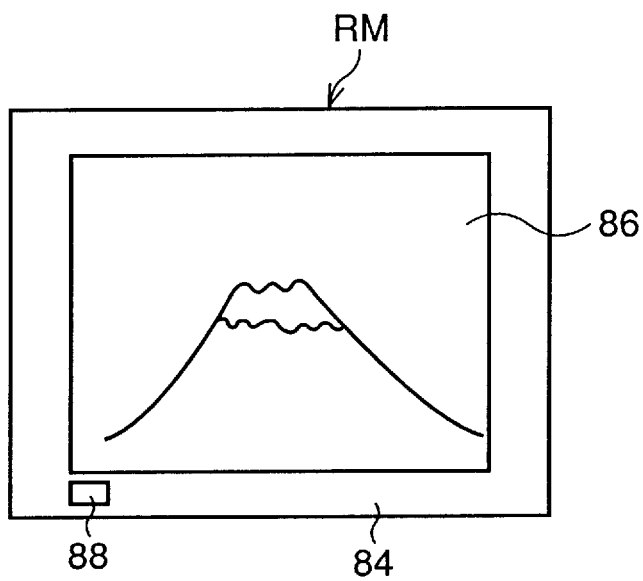
FIG. 5 is a front view showing an appearance of the electro-developing recording medium.

FIG. 5 shows an appearance of the electro-developing recording medium RM. As shown in this drawing, the recording medium RM has a rectangular frame member 84 for covering a peripheral margin area, and the frame member 84 defines an image-recording area 86 for forming an optical image thereon by the photographing optical system 12. As shown in FIG. 5, the frame member 84 has two opposed and aligned openings formed in the front and rear sides thereof in a suitable location, and the two opposed openings define a detective area 88 through which a transparency of the recording medium RM is detected.

Referring back to FIG. 2, a light source 90 and an optical sensor 92 are arranged at the sides of the shutter 34 so as to be aligned with each other, and a through hole 34a is formed in the shutter 34 so as to be aligned with the light source 90 and the optical sensor 92. When the electro-developing recording medium RM is loaded in the camera, as shown in FIG. 2, the detective area 88 of the recording medium RM is positioned between the through hole 34a of the shutter 34 and the optical sensor 92.

The light source 90 may comprise a light emitting diode (LED), and this LED is electrically energized by an LED drive circuit 94. The LED drive circuit 94 is controlled by the system control circuit 28 such that the light source or LED 90 is powered, ie., ON, by the LED drive circuit 94 at the time when the release switch 16 is turned ON, and such that a duration of the application of power to the LED 90 is suitably determined. For example, the duration of the LED 90 is at least more than the period of the time defined by the time $t_1$ indicated in the application of power to the graph of FIG. 4.

When the LED 90 is powered ON, the light rays emitted from the LED 90 pass through the hole 34a of the shutter 34 and the detective area 88 of the recording medium RM, and then are detected by the optical sensor 92, resulting in producing an electrical signal. Then, the produced electrical signal is amplified by an amplifier 96, and is converted into a digital data by an analog-digital converter (not shown), to be fetched by the system control circuit 28. Thus, a change of transparency of the recording medium RM can be detected, because the light rays passing through the detective area 88 of the recording medium RM carries transparency information.

To detect a loading of the recording medium RM into the camera, a recording medium detection sensor 98 is connected to the system control circuit 28, and is provided in the slot 11 of the camera body 10 at a suitable position. The detection sensor 98 may be constructed as a contact switch (CS). When the recording medium RM is loaded in the camera body 10, the detection sensor or contact switch 98 is turned ON. While the recording medium RM is unloaded from the camera body 10, the contact switch 98 is turned OFF. This ON/OFF signal is outputted from the contact switch 98 to system control circuit 24. Thus, it is possible to determine whether the recording medium RM is loaded in or unloaded from the camera.

Of course, another type of detection sensor 98 may be used to detect the loading of the recording medium RM of the camera body 10. For example, the detection sensor 98 may comprise an optical sensor, a magnet sensor or the like.

As mentioned above, the memory-medium used in the memory device or memory-medium driver 74 is utilized in the personal computer. Accordingly, the memory-medium such an IC memory card, a floppy disk, a detachable hard disk or the like must be formatted such that a memory area of the memory-medium is sectioned into a plurality of data-storage sections or files in accordance with an operating system (OS) used in the personal computer.

Figure 6:
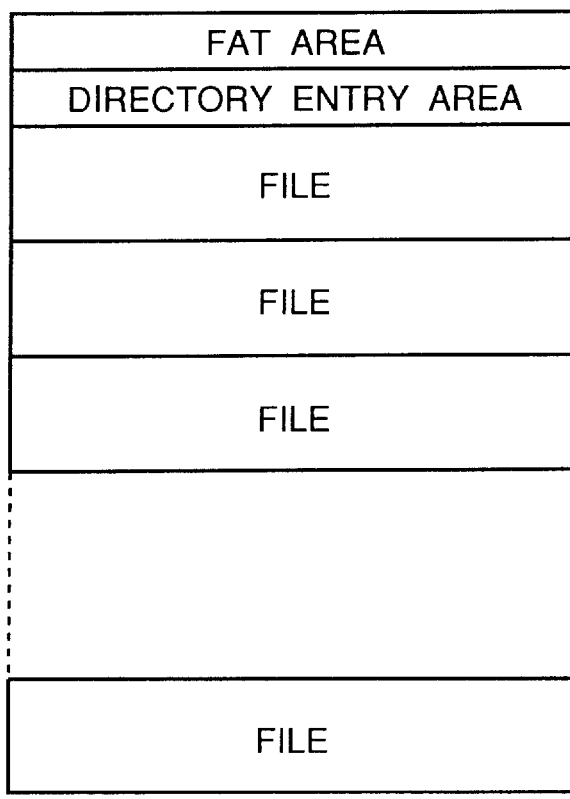

For example, when the personal computer uses the MS-DOS (Microsoft Corporation's trademark), the memory-medium should be formatted in a manner shown conceptually in FIG. 6. In particular, a memory area of the memory-medium is sectioned into a plurality of data-storage sections or files, and a FAT area and a directory entry area are defined in a part of the memory area of the memory-medium.

Figure 7:
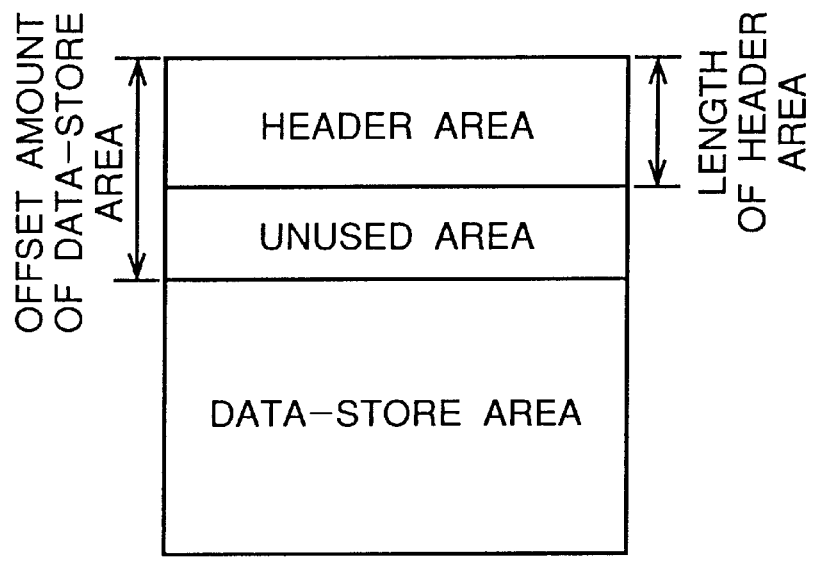
FIG. 7 shows a conceptual view showing one of the formatted files of the memory-medium shown in FIG. 6.

Also, as shown conceptually shown in FIG. 7, each of the data-storage sections or files is sectioned into a header area, an unused area (not usually utilized), and a data-storage area. Various information data is stored in the data-storage area, and information data having relevance to the file concerned (for example, a property of the file, a length of the header area, an offset amount of the data-storage area and so on) is stored in the header area. Accordingly, by having access to the header area of the file, it is possible to determine whether or not the file concerned is an image data file in which an image data is stored.

As mentioned above, the single-frame of image data obtained by the scanning operation is once stored in the memory 68, and then may be optionally fed to the memory-medium driver 74. According to the present invention, when the input of the single-frame of image data from the memory 68 to the memory-medium driver 74 is carried out, it can be determined in which files of the memory-medium the single-image data should be stored.

To this end, a file-selection switch (FS) 75 and a file-designation switch (FD) 77 are connected to the system control circuit 28. By manipulating the file-selection switch 75, a file-name is selected. The selected file-name is given to one of the files of the memory-medium by turning the file-designation switch 77 ON, such that the single-frame of image data fed from the memory 68 can be stored in the file designated by turning ON the file-designation switch 77.

For example, the file-selection switch 75 is constructed as a rotary switch, and a series of numbers is provided around the rotary switch 75. In this case, any one of the numbers is selected and indicated by rotating the rotary switch 75, and the selected number is given, as a file name, to one of the files of the memory-medium by the turning-ON of the file-designation switch 77. When the file-designation switch 77 is turned ON, a signal indicating the completion of the selection of file is outputted from the file-designation switch 77 to the system control circuit 28, and thus, it is determined to which files of the memory-medium the selected name should be given. Then, the single-frame of image data fed from the memory 68 is written and stored in the file to which the selected file-name has been given.

Also, when a single-frame of image data is transferred from the memory-medium driver 74 to the personal computer, the file-selection switch 75 and the file-designation switch 77 are used, whereby it can be determined from which files of the memory-medium the single-frame of image data should be read for the transfer of image data. Namely, one of the file names or numbers is selected by the manipulation of the file-selection switch 75, and then the file-designation switch 77 is tuned ON, so that the signal indicating the completion of the selection of file is outputted from the file-designation switch 77 to the system control circuit 28, whereby it is determined from which files of the memory-medium the single-frame of image data should be read.

Figure 8:
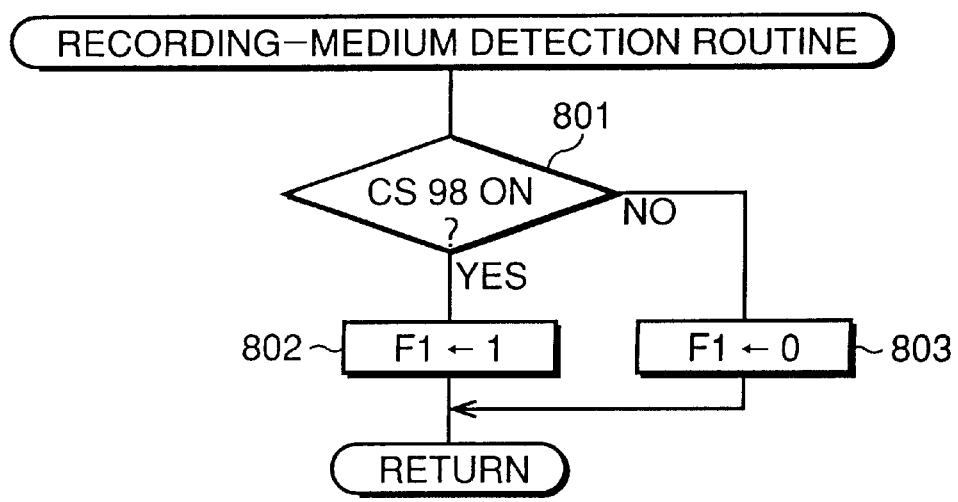
FIG. 8 is a flowchart showing a routine for detecting loading of the electro-developing recording medium in the electro-developing type still video camera according to the present invention.

FIG. 8 shows a flowchart for explaining a routine for detecting whether the electro-developing recording medium RM has been loaded in the camera body 10 through the slot 11. This routine is a time interruption routine executed at regular intervals of, for example, 10 μm, and the execution of the routine is started by turning the main switch or power switch 24 ON.

At step 801, it is determined whether the detection sensor or contact switch (CS) 98 has been turned ON so that the ON-signal is output from the contact switch 98 to the system control circuit 28.

When the ON-signal has been output from the contact switch 98 to the system control circuit 28, i.e., when the loading of the electro-developing recording medium RM into the camera body 10 has been detected by the contact switch 98, the control proceeds from step 801 to step 802, in which a flag F1 is made "1".

On the other hand, when the output of the ON-signal from the contact switch 98 to the system control circuit 28 has been stopped, i.e., when the unloading of the electro-developing recording medium RM from the camera body 10 is detected by the contact switch 98, the control proceeds from step 801 to step 803, in which the flag F1 is made "0".

Namely, the routine shown by the flowchart of FIG. 8 monitors the loading of the electro-developing recording medium RM into the camera body 10 at the regular intervals of 10 μm.

Figure 9:
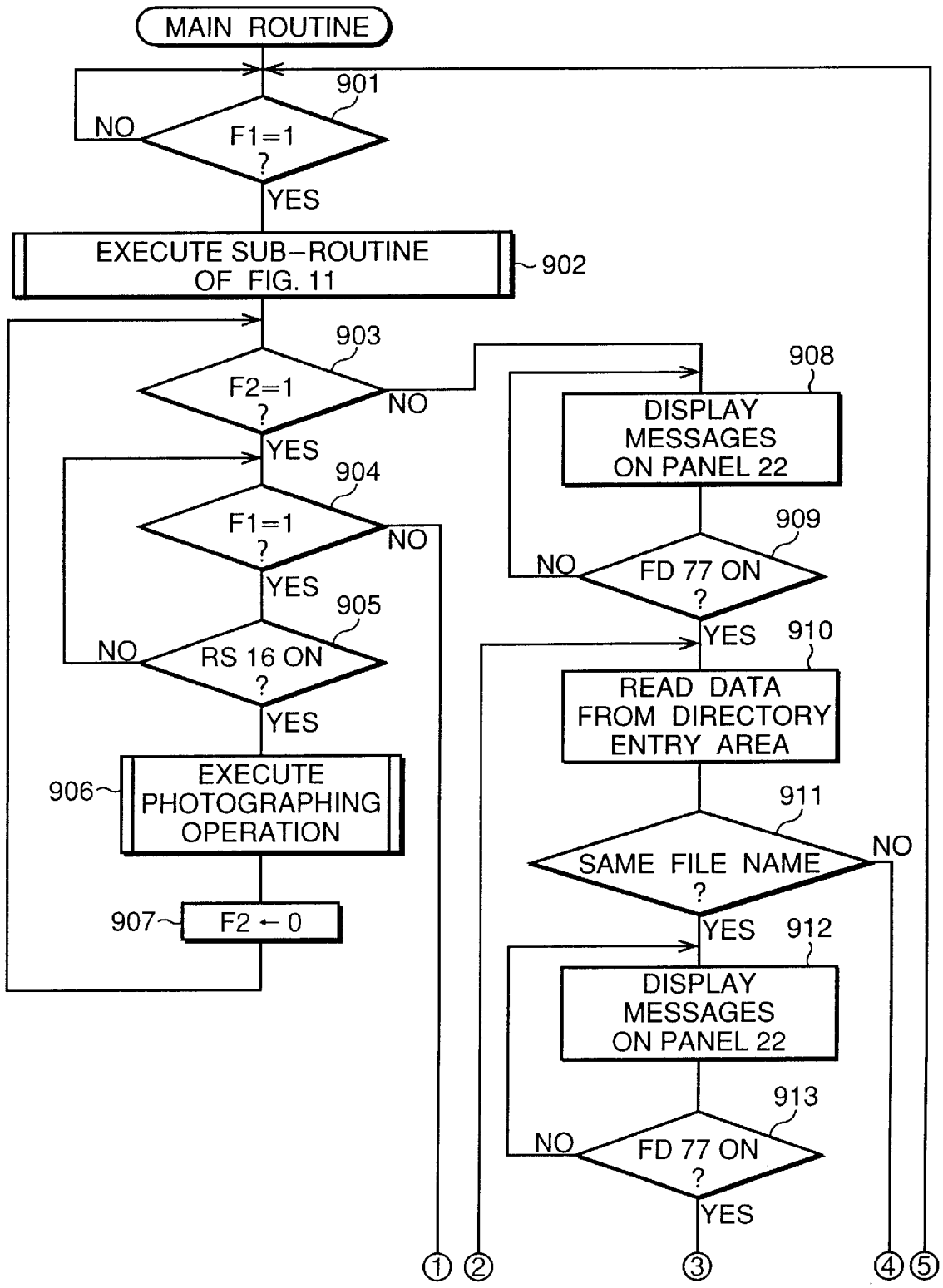
FIG. 9 is a part of a flowchart showing a main routine for an operation of the electro-developing type still video camera according to the present invention.
Figure 10:
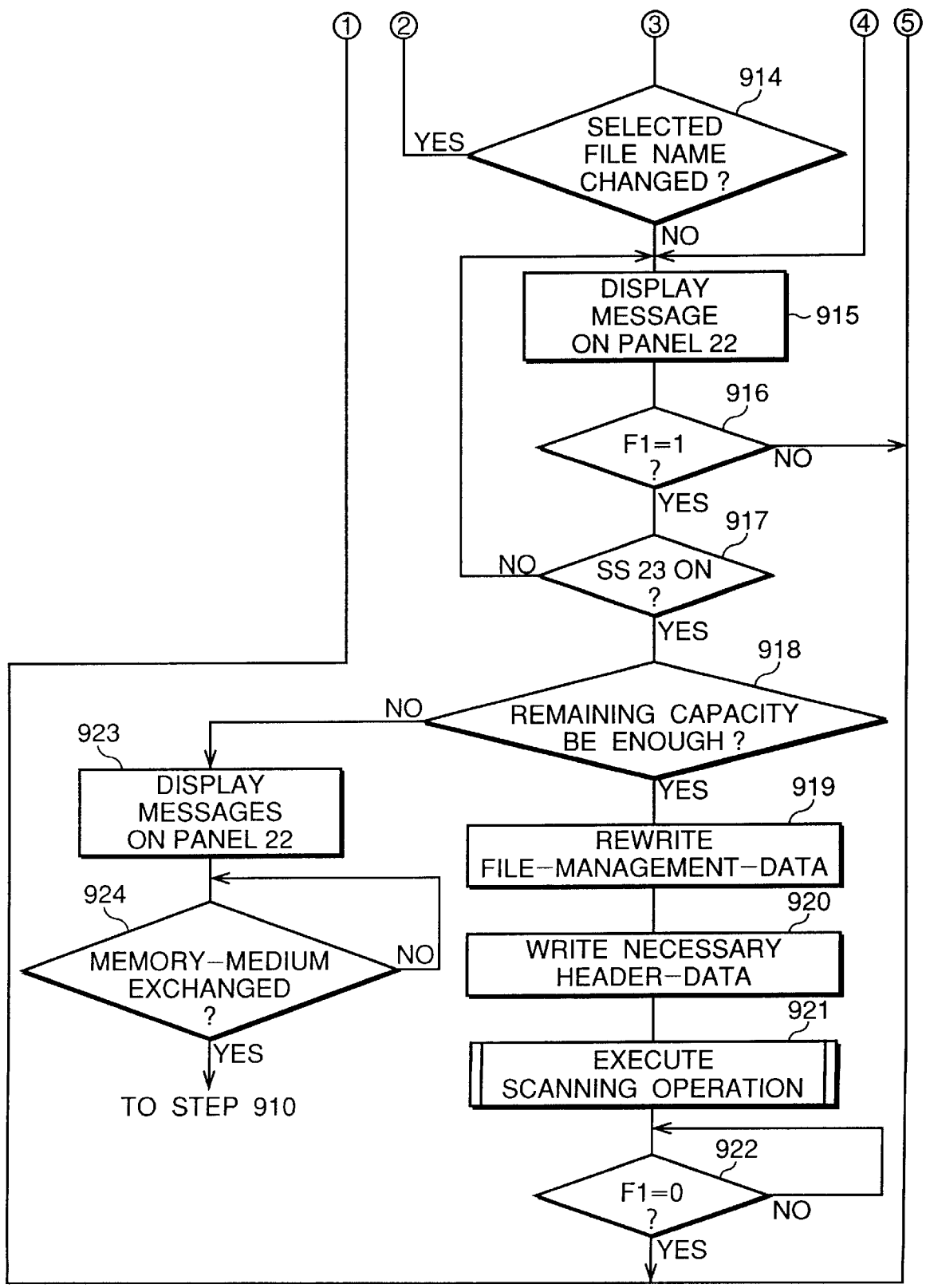
FIG. 10 is the remaining part of the flowchart shown in FIG. 9.

FIGS. 9 and 10 show a flowchart for explaining a main routine for operating the camera as mentioned above, and this routine is also executed by turning the power switch ON.

At step 901, it is determined whether the flag F1 is "1" or "0". As long as F1=0, i.e., as long as the electro-developing recording medium RM has not been loaded in the camera body 10, the routine remains at step 901, i.e., there is no further progress of the routine.

At step 901, if F1=1, i.e., if the loading of the electro-developing recording medium RM has been confirmed, the control proceeds to step 902, in which a sub-routine for determining whether the loaded recording medium RM has been recorded is executed. Note, this sub-routine is explained hereinafter in detail with reference to a flowchart of FIG. 11.

In short, if it has been confirmed that the loaded recording medium RM has not been recorded, a flag F2 is set to "1". On the other hand, if it has been confirmed that loaded recording medium RM is recorded on, the flag F2 is kept at the initial setting or "0".

Figure 11:
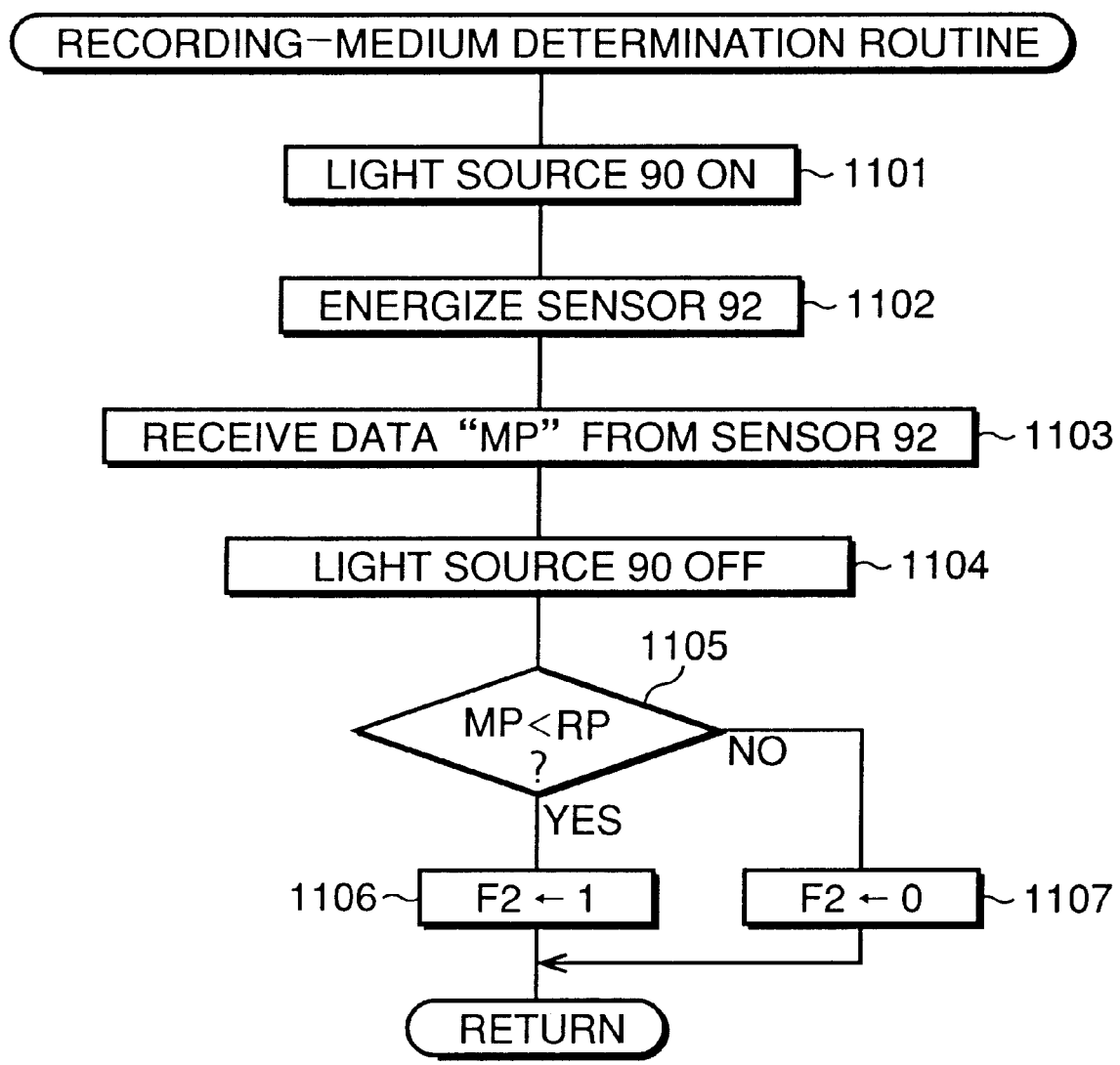
FIG. 11 is a flowchart showing a recording-medium determination routine for determining whether the electro-developing recording medium has been recorded in the electro-developing type still video camera according to the present invention.

After the execution of the sub-routine of FIG. 11 is completed, the control returns from the sub-routine to step 903 of the main routine, in which it is determined whether the flag F2 is "1" or "0". If F2=1, i.e., if the loaded recording medium RM has not been recorded, the control proceeds to step 904, in which it is again determined whether the flag F1 is "1" or "0". If F1=1, i.e., if the loading of the recording medium PM concerned is kept, the control proceeds to step 905, in which it is determined whether the release switch (RS) 16 is turned ON. If the release switch 16 is not turned ON, the control returns to step 904. Namely, the routine including steps 904 and 905 is repeated until the release switch 16 is turned ON.

Note, if F2=1, the LCD panel 22 may display a message announcing that the loaded recording medium RM has not been recorded, and a message announcing that a photographing operation is executed by turning the release switch 16 ON.

The routine comprising steps 904 and 905 prevents a case where the loaded recording medium RM is discharged from the camera body 10 by depressing the ejector button 27 before the turning-ON of the release switch 16 is not carried out for some reasons. For example, in the case where a blank recording medium RM is mistaken for a developed recording medium RM, and is erroneously loaded in the camera for a scanning operation or image-reading operation, such a blank recording medium RM might be discharged from the camera body 10 due to the message of the LCD panel 22 which announces that the loaded recording medium RM is not recorded on.

Accordingly, during the repetition of steps 904 and 905, if the loaded recording medium RM is discharged from the camera body 10 by the depression of the ejector button 27, the control returns from the step 904 to step 901. Then, the camera stands ready for a further loading of the recording medium RM.

Of course, during the repetition of steps 904 and 905, if the release switch 16 is turned ON, the control proceeds from step 905 to 906, in which the photographing operation is executed. Note, the photographing operation will be explained in detail with reference to FIGS. 12 and 13.

After the photographing operation is completed, the control proceeds to step 907, in which the flag F2 is set to "0" because the loaded recording medium RM has been yet recorded on due to the completion of the photographing operation. Then, the control returns from step 907 to step 903.

When it has been confirmed at step 902 that the loaded recording medium RM is recorded on by the execution of the sub-routine of FIG. 11, or when the control has returned from step 907 to step 903 after the completion of the photographing operation, the flag F2=0. In this case, the control proceeds from step 903 to step 908, in which the LCD panel 22 displays messages such as: a message announcing that the loaded recording medium RM is recorded ON; a message announcing that the scanning operation can be executed by turning the scan start switch 23; and a message announcing that a file-name can be selected by the file-selection switch 75 upon executing the scanning operation.

At step 909, it is determined whether the file-designation switch 77 is turned ON. Namely, the camera is in a standby mode until the turning-ON of the file-designation switch 77 is carried out after the file-name is selected by the file-selection switch 75 for storing the single-frame of image data obtained by the execution of the scanning operation.

When the turning-ON of the file-designation switch 77 is confirmed, the control proceeds from step 909 to step 910, in which information data is read from the directory entry area of the memory-medium. Then, at step 911, it is determined whether the same file-name as the selected file-name is already stored in the directory entry area on the basis of the information data read from the directory entry area of the memory-medium (i.e., whether information has already been stored under the selected file name).

If there is the same file-name as the selected file name, the control proceeds to step 912, in which the LCD panel 22 displays a message announcing that the there is the same file-name as the selected file name, and a message announcing that the selected file-name can be changed into another file-name by manipulating the file-selection switch or rotary switch 75. Then, the control proceeds to step 913, in which it is determined whether or not the file-designation switch 77 is turned ON. When the turning-ON of the file-designation switch 77 is not carried out, the control returns to step 912. Namely, steps 912 and 913 are repeated as long as the file-designation switch 77 is turned ON.

During the repetition of steps 912 and 913, if the selected file-name should be changed into another file-name, the rotary switch 75 is manipulated or rotated to thereby select another file-name or number. On the other hand, if the selected file-name should be not changed, the rotary switch 77 cannot be rotated, and thus the selected file-name or number is maintained. These procedures may be previously announced to users or a message announcing the same may be displayed on the LCD panel 22.

In either case, when the file-designation switch 77 is turned ON, the control proceeds from step 913 to step 914, in which it is determined whether or not the change of the selected file-name has been carried out. If the selected file-name has been changed, the control returns from step 914 to the step 910, and then the routine comprising steps 910, 912, 913, and 914 is repeated.

On the other hand, if the selected file-name has not been changed, the control proceeds from step 914 to step 915. Also, at step 911, If there is no same file-name as the selected file name, the control proceeds from step 911 to step 915.

At step 915, the LCD panel 22 displays a message announcing that the scanning operation can be executed by turning the scan start switch 23 ON. Then, at step 916, it is determined whether the flag F1 is "1", it is determined whether or not the recording medium RM is loaded in the camera body 10. If F1=1, the control proceeds to step 917, in which it is determined whether or not the scan start switch 23 is turned ON. If the turning-ON of the scan start switch 23 is not carried out, the control returns from step 917 to step 915. Namely, the routine comprising steps 915, 916, and 917 is repeated until the scan start switch 23 is turned ON.

The routine comprising step 915, 916, and 917 provides against a case where the loaded recording medium RM concerned is discharged from the camera body 10 by depressing the ejector button 27 before the turning-ON of the scan start switch 23 is not carried out for some reasons. For example, in the case where the scanning operation is cancelled and another photographing operation is carried out, the loaded recording medium RM concerned might be discharged from the camera body 10 by the depression of the ejector button 27.

Accordingly, during the repetition of the routine comprising steps 915, 916, and 917, if the discharge of the loaded recording medium RM from the camera body 10 is carried out, the control returns from step 916 to step 901. Then, the camera stands ready for a further loading of the recording medium RM.

On the other hand, during the repetition of the routine comprising steps 915, 916, and 917, if the scan start switch 23 is turned ON, the control proceeds from step 918, in which it is determined whether or not the remaining capacity of the memory-medium is sufficient to store the single-frame of image data.

When the memory-medium has sufficient remaining capacity for storage of a single-frame of image data, control proceeds to step 919, in which the file management data held in the directory entry area and the FAT area of the memory-medium are partially rewritten. Then, the control proceeds to step 920, in which necessary header data containing a file-property, a length of header area, an offset amount of data-storage area and so on is written in the header area of the designated file having the selected file-name.

At step 921, the scanning operation or image-reading operation for reading optically and electronically the developed image from the recording medium RM is executed. Note, the scanning operation will be explained in detail with reference to FIGS. 14 and 15. The single-frame of image data obtained by the scanning operation is once stored in the memory 68, and is then output to the memory-medium driver 74, whereby the single-frame of image data is written and stored in the data-storage area of the appropriate file of the memory-medium.

If there is a same file-name as the selected file name (step 911), and where the change of the selected file-name is not carried out (step 912), the previous data held in the data-storage area of the file concerned is lost upon writing the single-frame of image data obtained by the scanning operation. This is because the single-frame of image data is superscripted over the previous data.

After the scanning operation is completed, the control returns to step 922, in which it is determined whether the flag F1 is "0", i.e., the loaded recording medium RM is discharged from the camera body 10 through the slot 11 by the depression of eject bottom 27. When the loaded recording medium RM is discharged from the camera body 10, the flag F1 is made "0" due to the execution of the recording medium detection routine shown in FIG. 8. Then, the control returns from step 922 to step 901.

At step 918, if the remaining capacity of the memory-medium is short of storage for a single-frame of image data, the control proceeds from step 918 to step 923, in which the LCD panel 22 displays a message announcing shortage of the remaining capacity of the memory-medium for the storage of the single-frame of image data. Of course, in this case, the scanning operation or image-reading operation cannot be executed. Then, at step 924, it is determined whether or not the memory-medium concerned is exchanged into another one (i.e., the memory medium is exchanged with either an unused memory or a used memory which has enough storage space to store the single-frame of image data). When the exchange of the memory-medium with the other one is carried out, the control returns from step 924 to step 910.

FIG. 11 shows a flowchart explaining the sub-routine executed in step 902 of the flowchart shown in FIGS. 9 and 10, to determine whether or not the loaded recording medium RM has been recorded on or not, as mentioned above. Note, this sub-routine is executed whenever an electro-developing recording medium RM is loaded into the camera body 10 through the slot 11.

At step 1101, the light source 90 is turned ON by the LED drive circuit 94, and, at step 1102, the optical sensor 92 is electrically energized under the control of the system control circuit 28. Light rays emitted from the light source 90 are transmitted through the detective zone 88 of the recording medium RM, and are then detected by the optical sensor 92, resulting in production of an electrical signal carrying the transparency information of the detective zone 88. The electrical signal is amplified by the amplifier 96, and is converted into digital data by the analog-digital converter (not shown), as mentioned above.

At step 1103, the converted digital data is fetched as transparency data "MP" by the system control circuit 28, and the transparency data "MP" is temporarily stored in the RAM of the system control circuit 28. Then, at step 1104, the LED 90 is deenergized.

At step 1105, the transparency data "MP" is compared with threshold data "RP", i.e., it is determined whether or not the transparency data "MP" is smaller than the threshold data "RP". Note, the threshold data "RP" is stored in the ROM of the system control circuit 28, and corresponds to a level "RL" of the curve A shown in the graph of FIG. 4.

If the loaded recording medium RM is not recorded on, the transparency data "MP" of the detective zone 88 must have a minimum level corresponding to the minimum level "ML" of the curve A shown in the graph of FIG. 4. In this case, the transparency data "MP" must be considerably smaller than the threshold data "RP" corresponding to the level "RL" shown in FIG. 4.

On the other hand, if the loaded recording medium RM is recorded on, the transparency data "MP" of the detective zone 88 must have a considerably higher level than the threshold data "RP" corresponding to the level "RL" shown in FIG. 4.

Accordingly, at step 1105, when the transparency data "MP" is smaller than the threshold data "RP", i.e., when the loaded recording medium RM has not been recorded on, the control proceeds from step 1105 to step 1106, in which the flag F2 is made "1". On the other hand, at step 1105, when the transparency data "MP" is larger than the threshold data "RP", i.e., when the loaded recording medium RM has been recorded on, the control proceeds from step 1105 to step 1107, in which the flag F2 is made "0".

Figure 12:
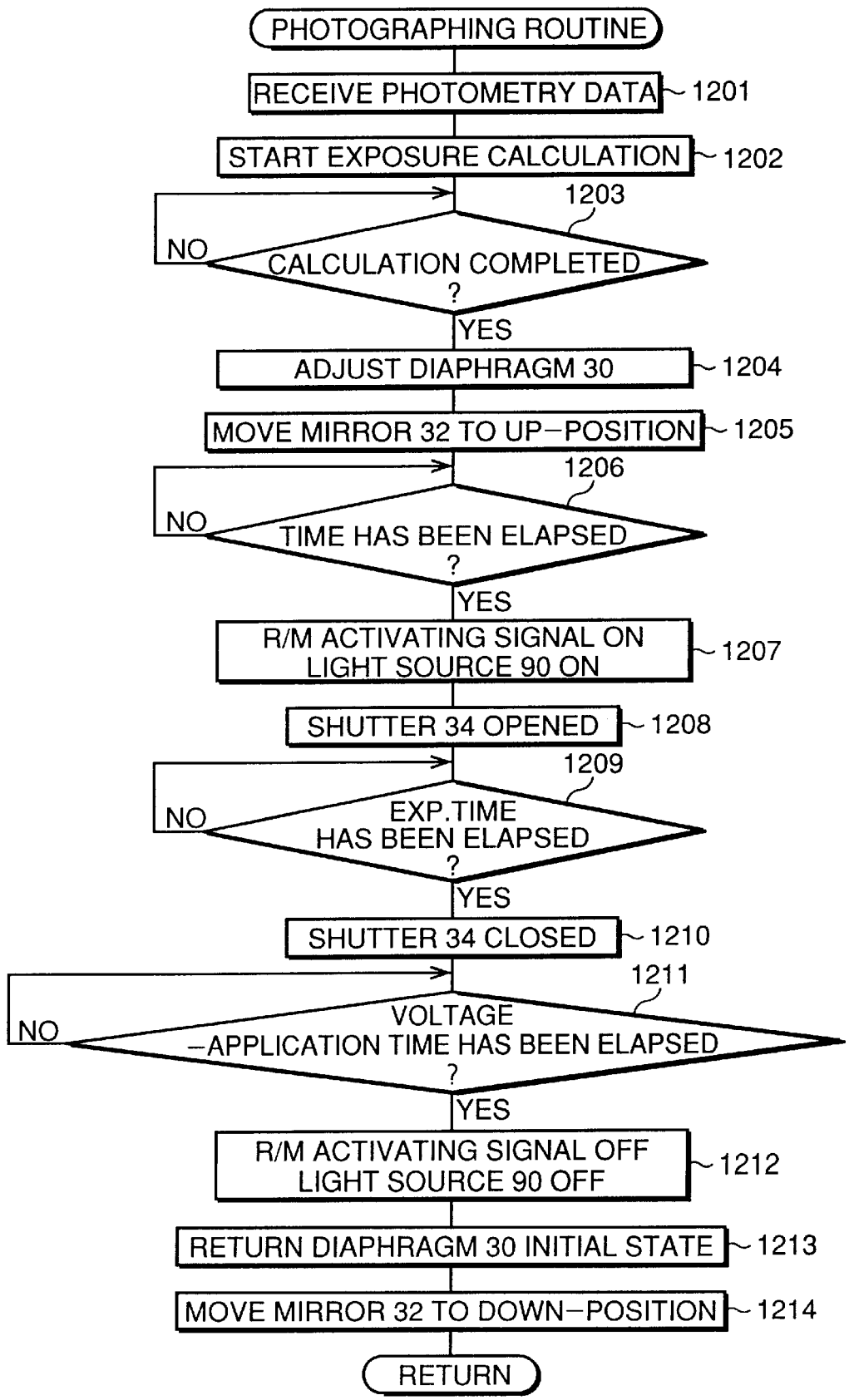
FIG. 12 is a flowchart showing a photographing routine executed by the electro-developing type still video camera according to the present invention.
Figure 13:
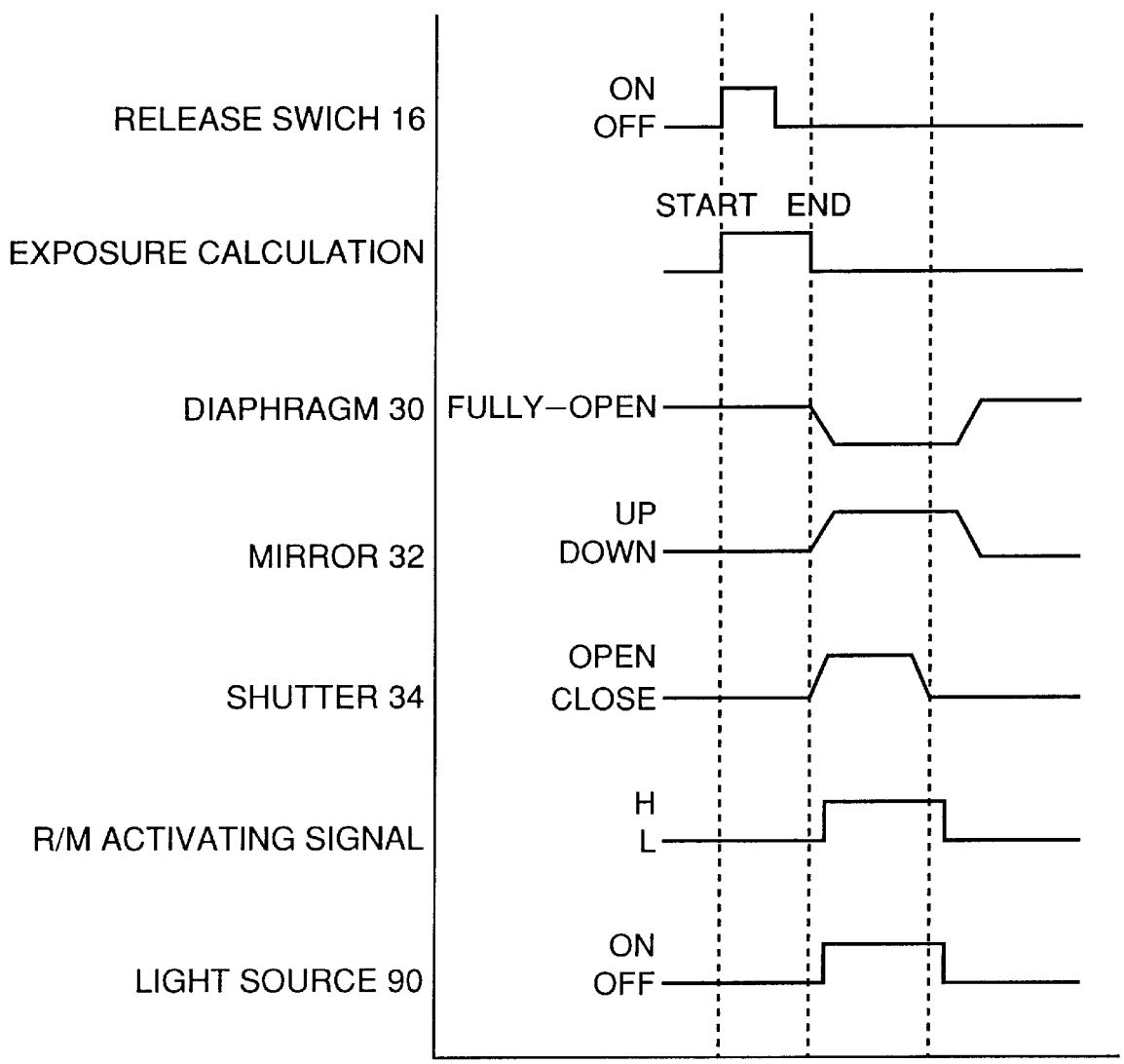
FIG. 13 is a timing chart of the photographing routine of FIG. 12.

FIG. 12 shows a flowchart for explaining the photographing routine executed in step 906 of the flowchart of FIGS. 9 and 10, and FIG. 13 shows a timing chart for explaining this photographing routine.

The execution of the photographing routine is started by turning the release switch 16 ON during the repetition of the routine including steps 904 and 905 in the flowchart of FIGS. 9 and 10. Namely, when the release switch 16 has been turned ON, a command pulse for the execution of the photographing routine is produced as shown in the timing chart of FIG. 13, and is then inputted to the system control circuit 28.

At step 1201, an output signal of the photometry sensor 18, i.e., a photometry value, is detected and received by the system control circuit 28. Then, at step 1202, an exposure calculation is started based on the received photometry value (see FIG. 13).

At step 1203, it is determined whether or not the exposure calculation is completed. When the completion of the exposure calculation has been confirmed (see FIG. 13), the control proceeds to step 1204, in which the size of the aperture or diaphragm 30 is adjusted in accordance with the calculated result (see FIG. 13). Note, since the diaphragm 30 initially has a fully-opened size, the adjustment of the diaphragm 30 is performed so that the fully-opened size is made smaller as shown in the timing chart of FIG. 13.

At step 1205, the quick return mirror 32 is moved from the down-position (solid lines) to the up-position (broken lines), as shown in the timing chart of FIG. 13, by operating the mirror drive circuit 40 under control of the exposure control circuit 44.

At step 1206, it is determined whether or not a predetermined period of time has elapsed. This period of time is a duration necessary for the adjustment of the diaphragm 30 and the movement of the quick return mirror 32 from the down-position to the up-position.

When the given period of time has elapsed, i.e., when the adjustment of the diaphragm 30 and the movement of the quick return mirror 32 from the down-position to the up-position has been completed, the control proceeds from step 1206 to step 1207, in which a recording medium activating signal outputted from the recording medium drive circuit 46 to the electro-developing recording medium RM is turned ON, and in which the light source or LED 90 is powered ON.

Namely, the recording medium activating signal is changed from the low level to the high level, as shown in the timing chart of FIG. 13, so that the activating voltage is applied between the electrostatic information recording medium 78 and the electric charge keeping medium or liquid crystal display 80. At the same time, the LED 90 is powered ON, as shown in the timing chart of FIG. 13, by the LED drive circuit 94, and the detective zone 88 of the recording medium RM is exposed with the light rays emitted from the LED 90 and passing through the hole 34a of the shutter 34.

At step 1208, the shutter 34 is opened by operating the shutter drive circuit 42 under control of the exposure control circuit 44 (see FIG. 13), so that an optical image is focussed and formed on the light receiving surface of the recording medium RM by the photographing optical system 12. Then, at step 1209, it is determined whether or not a certain exposure time has elapsed on the basis of the calculated result.

When the proper time of exposure has elapsed, the control proceeds from step 1209 to step 1210, in which the shutter 43 is closed (see FIG. 13). Then, at step 1211, it is determined whether or not the proper time of application of the voltage to the recording medium RM has elapsed.

When the proper time of application of the voltage to the recording medium RM has elapsed, the control proceeds from step 1211 to step 1212, in which the recording medium activating signal outputted from the drive circuit 46 to the recording medium RM is changed from the high level to the low level, as shown in the timing chart of FIG. 13, and in which the light source or LED 90 is powered OFF, as shown in the timing chart of FIG. 13.

At step 1213, the aperture of the diaphragm 30 is returned to the fully-open size, and the quick return mirror 32 is returned from the up-position to the down-position, as shown in the timing chart of FIG. 13.

Thus, the photographing routine is finished, and the optical image obtained by the photographing optical system 12 is developed in the electric charge keeping medium or liquid crystal display 80 of the recording medium RM. Namely, the loaded recording medium RM has been recorded.

As is apparent from the descriptions of the flowchart of FIGS. 9 and 10, after the photographing routine is finished, the control returns to step 907.

Figure 14:
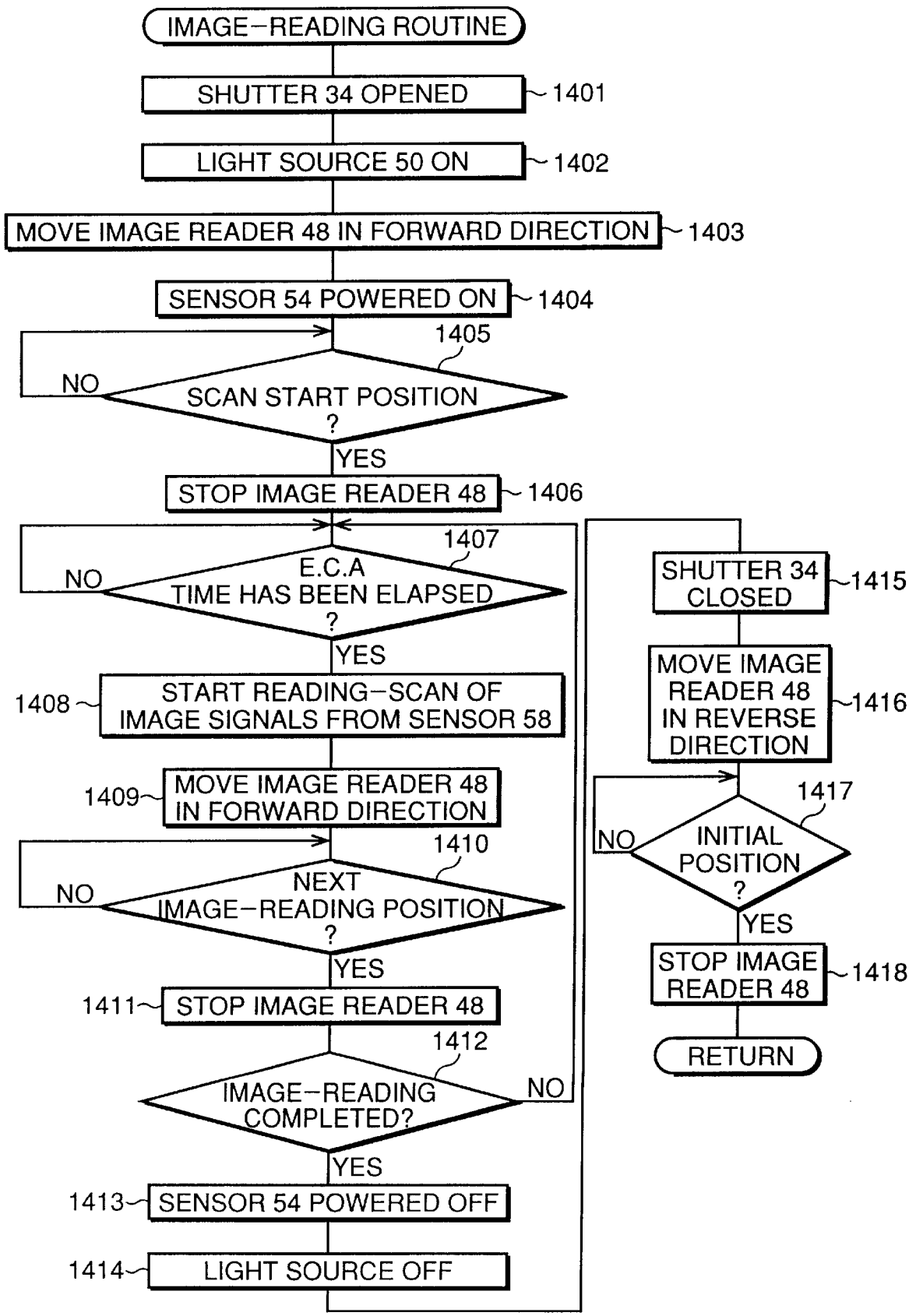
FIG. 14 is a flowchart showing an image-reading routine executed by the electro-developing type still video camera according to the present invention.
Figure 15:
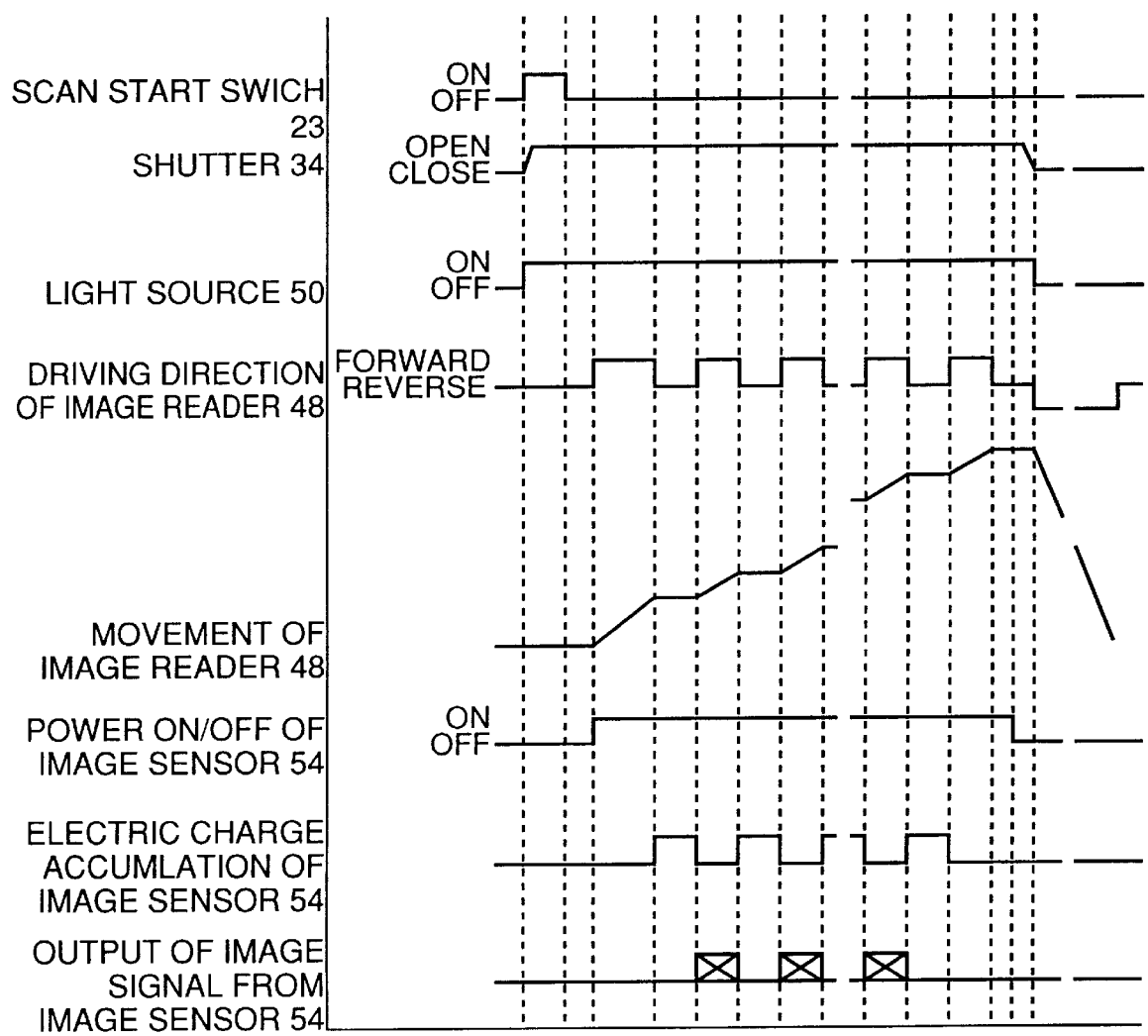
FIG. 15 is a timing chart for explaining the image-reading routine of FIG. 14.

FIG. 14 shows a flowchart for explaining the imagereading routine (scanning operation) executed in step 921 of the flowchart of FIGS. 9 and 10, and FIG. 15 shows a timing chart for explaining this image-reading routine.

The execution of the image-reading routine is started by turning the scan start switch 23 ON. Namely, when the scan start switch 23 has been turned ON, a command pulse for the execution of the image-reading routine is produced as shown in the timing chart of FIG. 15, and is input to the system control circuit 28. Note, as mentioned above, when the remaining capacity of the memory-medium is not sufficient to store a single-frame of image data, the execution of the image-reading routine is immediately cancelled (step 918 of Fig.10).

At step 1401, the shutter 34 is opened by the shutter drive circuit 42, and, at step 1402, the light source 50 of the image-reader 48 is turned ON by the light source drive circuit 56 (see FIG. 15). Then, the control proceeds to step 1403, in which the drive motor (not shown) of the image-reader 48 is driven forward by the scanner drive circuit 58 such that the image-reader 48 is moved from the lower position (shown by the solid lines in FIG. 2) toward the scan start position (see FIG. 15). Successively, at step 1404, the line image-sensor 54 is powered ON by the line sensor drive circuit 60 as shown in the timing chart of FIG. 15.

At step 1405, it is determined whether or not the line image-sensor 54 has reached the scan start position. When the arrival of the image-reader 54 at the scan start position has been confirmed, the control proceeds from step 1405 to step 1406, in which the image-reader 48 is once stopped at the scan start position. Thus, the light rays emitted from the linear light source 50 and passing through the developed image of the recording medium RM are focussed on the linear light receiving surface of the line image-sensor 54 by the scanner optical system 52, and electric charge accumulation in the line image-sensor 54 is started (see FIG. 15)

Note, the discontinuation of the image-reader 48 at the scan start position may be controlled by counting a number of drive pulses outputted from the scanner drive circuit 60 to the drive motor of the image-reader 48.

At step 1407, it is determined whether or not a proper time of electric charge accumulation in the line image-sensor 54 has elapsed (see FIG. 15). When the proper time of electric charge accumulation has elapsed, i.e., when the electric charge accumulation in the line image-sensor 54 ha s been completed, the control proceeds from step 1407 to step 1408, in which a reading-scan of image pixel signals from the line image-sensor 54 is started by the line sensor drive circuit 60 (see FIG. 15).

At step 1409, the drive motor (not shown) of the image-reader 48 is again driven forward by the scanner drive circuit 58 such that the image-reader 48 is moved upward from the scan start position toward the next image-reading position, as shown in the timing chart of FIG. 15. Then, at step 1410, it is determined whether or not the image-reader 48 has reached the next image-reading position.

When the positioning of the image-reader 48 at the next image-reading position has been confirmed, the control proceeds from step 1410 to step 1411, in which the image-reader 48 is stopped at the next image-reading position (see FIG. 15). Note that the discontinuation of the image-reader 48 at the next image-reading position may also be controlled by counting a number of drive pulses outputted from the scanner drive circuit 60 to the drive motor of the image-reader 48.

At step 1412, it is determined whether or not the developed image of the electro-developing recording medium RM has been completely read. If the reading of the developed image from the recording medium RM is not completed, the control returns from step 1412 to step 1407. Namely, the intermittent movement or scanning-movement of the image-reader 48 is repeated until the completion of the reading of the developed image from the recording medium RM.

For example, when the developed image are completely read by the scanning-steps for 20,000 times, the routine including steps 1007 to 1012 is repeated 20,000 times, and the read image is reproduced for 20,000 horizontal scanning lines.

As is apparent from the timing chart of FIG. 15, the reading-scan of the image pixel signals from the line image-sensor 54 is carried out during a movement of the image-reader 48 between the two adjacent scanning steps or two adjacent image-reading positions. As mentioned hereinbefore, the image pixel signals read-out from the line image-sensor 54 are successively amplified by the amplifier 62, and are converted into digital pixel signals by the A/D converter 64. Then, the digital pixel signals are processed by the image processing circuit 66, and are temporarily stored in the memory 68.

At step 1412, when it has been confirmed that the reading of the developed image from the recording medium RM is completed, the control proceeds to step 1413, in which the sensor 54 is powered OFF (see FIG. 15). Then, at step 1414, the light source 50 is turned OFF, and, at step 1415, the shutter 34 is closed (see FIG. 15).

At step 1416, the drive motor (not shown) of the image-reader 48 is reversely driven by the scanner drive circuit 58 such that the image-reader 48 is moved downward to the lower position or initial position, as shown in the timing chart of FIG. 15. Then, at step 1417, it is determined whether or not the image-reader 48 has reached the initial position.

When the positioning of the image-reader 48 at the initial position has been confirmed, the control proceeds to step 1417 to step 1418, in which the image-reader 48 is stopped at the initial position. The discontinuation of the image-reader 48 at the initial position may be controlled by detecting a part of the carriage member 55 with, for example, a photo-interrupter type sensor (not shown). Thus, the scanning operation or image-reading operation is finished.

As is apparent from the descriptions of the flowchart of FIGS. 9 and 10, after the image-reading routine is finished, the control returns to step 922 thereof.

Figure 16:
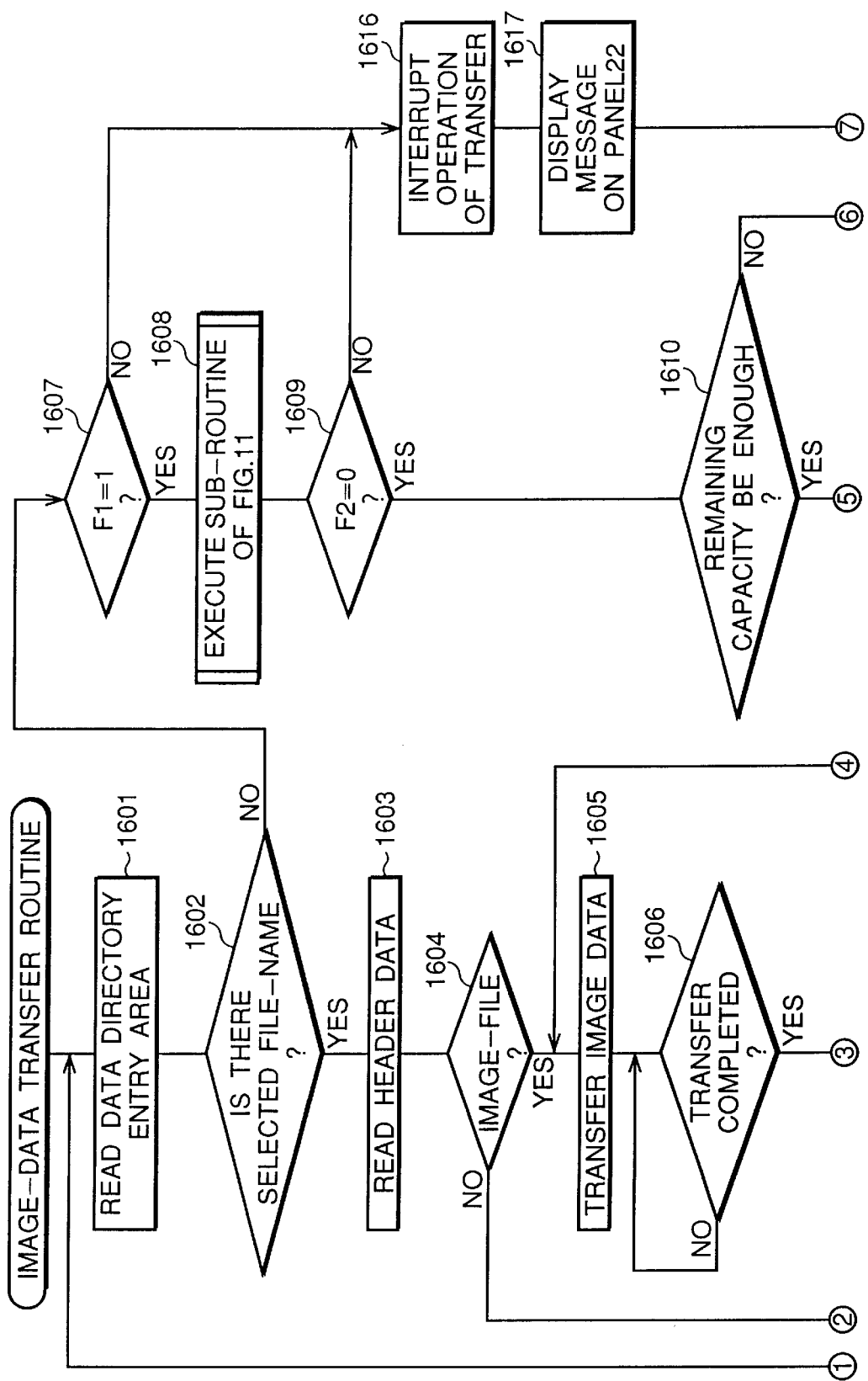
FIG. 16 is a part of a flowchart showing an image-data transfer routine executed by the electro-developing type still video camera according to the present invention, for transferring image data to an external personal computer.
Figure 17:
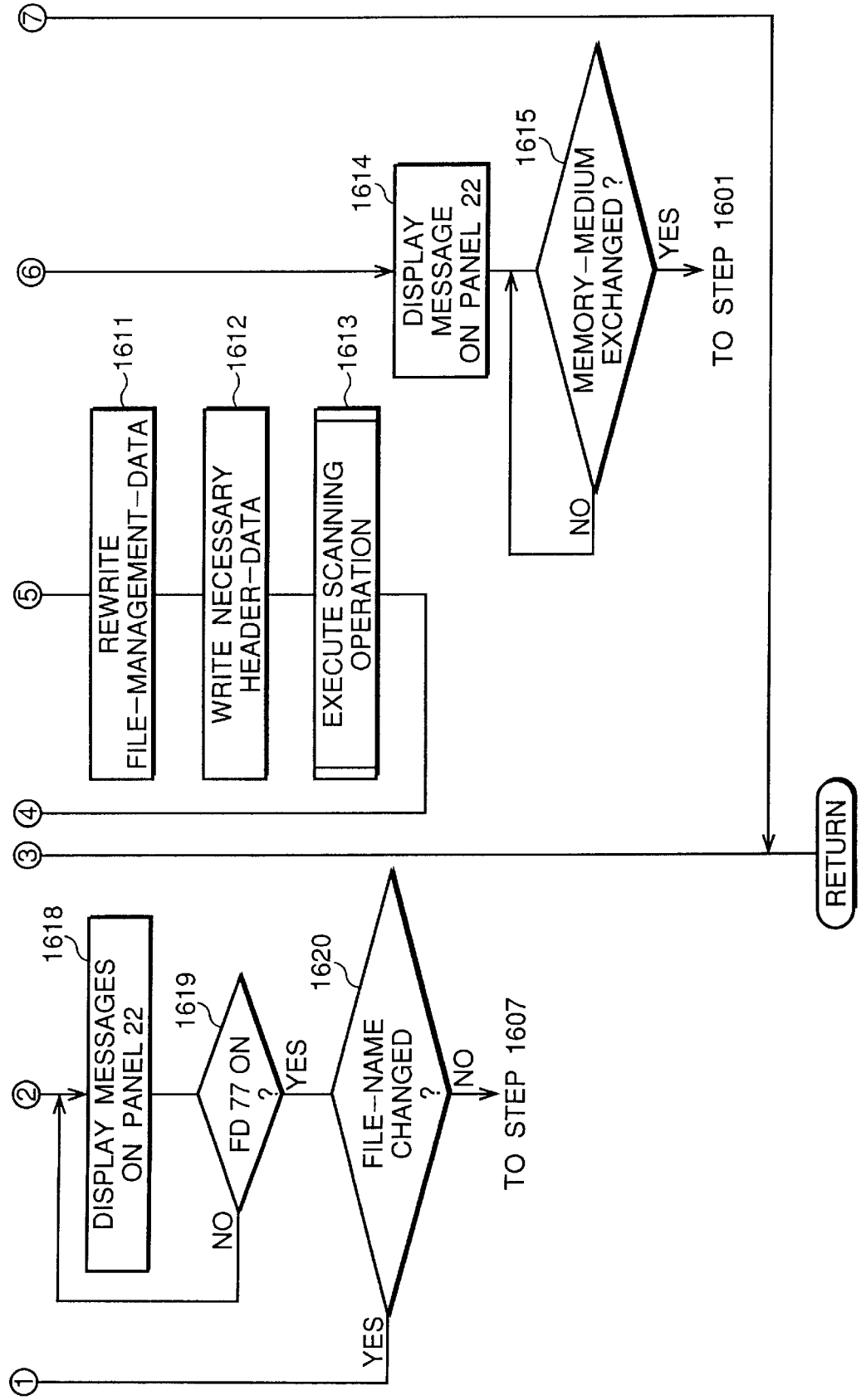
FIG. 17 is the remaining part of the flowchart showing the image-data transfer routine.

FIGS. 16 and 17 show a flowchart for an image data transfer routine for transferring a single-frame of image data from the memory-medium of the memory-medium driver 74 to the external processing device or personal computer.

This image data transfer routine is a time interruption routine, which is, for example, executed when a request signal for the transfer of image data is output from the personal computer to the system control circuit 28. Of course, in this case, the camera is connected to the personal computer through the interface connector 26.

At step 1601, the file-name data is read from the directory entry area of the memory-medium loaded in the driver 74, and, at step 1602, it is determined whether or not the same file-name as a file-name selected by the file-selection switch 75 is included in the read file-name data.

When there is the selected file-name in the memory-medium, the control proceeds to step 1603, in which the header information data is read from the header area of the file having the selected file-name. Then, at step 1604, it is determined whether or not the file concerned is an image-file, i.e., the data stored in the data-storage area of the file concerned is an image data.

If the file concerned is an image-file, the control proceeds from step 1604 to step 1605, in which the single-frame of image data is read from the data-storage area of the file concerned, and the read image data is transferred from the camera to the personal computer through the interface circuit 70 and the interface connector 26. At step 1606, it is determined whether or not the transfer of image data from the camera to the personal computer is completed.

When the completion of the transfer of image data is confirmed, this routine is once finished. Of course, if the demand signal is outputted from the personal computer to the camera, the routine is executed again.

At step 1602, if the same file-name as the selected file-name is not included in the read file-name data, i.e., if the selected file-name is not in the memory-medium, the control proceeds from step 1602 to step 1607, in which it is determined whether or not the flag F1 is "1".

If F1=1, i.e., if an electro-developing recording medium RM is loaded in the camera body 10, the control proceeds from step 1607 to step 1608, in which the recording medium determination routine of FIG. 11 is executed. When the execution of the routine of FIG. 11 is confirmed, the control proceeds to step 1609, in which it is determined whether or not the flag F2 is "0", i.e., it is determined whether or not the loaded recording medium RM has been recorded on If F=0, the control proceeds from 1609 to step 1610, in which it is determined whether or not the remaining capacity of the memory-medium is enough to store the single-frame of image data. If the memory-medium has enough remaining capacity for storage of a single-frame of image data, the control proceeds from 1610 to step 1611, in which the file management data held in the directory entry area and the FAT area of the memory-medium are partially re-written to thereby give a file-name to one of the files of the memory-medium. Then, the control proceeds to step 1612, in which necessary header data including a file-property, a length of header area, an offset amount of data-storage area and so on is written in the header area of the named file.

At step 1613, the scanning operation or image-reading operation of FIGS. 14 is executed. The single-frame of image data obtained by the scanning operation is once stored in the memory 68, and is then fed to the memory-medium driver 74., whereby the single-frame of image data is written and stored in the data-storage area of the named file of the memory-medium.

When the scanning operation is completed, the control proceeds to step 1605, in which the single-frame of image data read from the data-storage area of the file concerned is transferred from the camera to the personal computer in the same manner as mentioned above.

At step 1610, if the remaining capacity of the memory-medium is not sufficient to store a single-frame of image data, the control proceeds from step 1610 to step 1614, in which the LCD panel 22 displays a message announcing the shortage of the remaining capacity of the memory-medium for the storage of a single-frame of image data. Of course, in this case, the scanning operation or image-reading operation cannot be executed. Then, at step 1615, it is determined whether or not the memory-medium concerned is exchanged into another one. When the exchange of the memory-medium with another one is carried out, the control returns from step 1615 to step 1601.

At step 1607, if F1=0, i.e., if the recording medium RM is unloaded in the camera body 10, the control proceeds to step 1616, in which the operation for the transfer of image data is interrupted. Then, at step 1617, the LCD panel 22 displays a message announcing that there is no image data to be transferred to the personal computer. Thus, the routine is finished. Also, at step 1609, if F2=1, i.e., the loaded recording medium RM is not recorded on, the control proceeds to step 1618.

At step 1604, when the selected file is not an image-file, i.e., when the data stored in the data-storage area of the file concerned is not an image data, the control proceeds from step 1604 to step 1618, in which the LCD panel 22 displays a message announcing that the selected file is not the image-file, and a message announcing that the selected file-name can be changed into another file-name by manipulating the file-selection switch or rotary switch 75. Then, the control proceeds to step 1619, in which it is determined whether or not the file-designation switch 77 is turned ON. When the turning-ON of the file-designation switch 77 is not carried out, the control returns to step 1618. Namely, steps 1618 and 1619 is repeated as long as the file-designation switch 77 is turned ON.

During the repetition of steps 1618 and 1619, if the selected file-name should be changed into another file-name, the rotary switch 75 is manipulated or rotated to thereby select another file-name or number. On the other hand, if the selected file-name should not be changed, the rotary switch 77 cannot be rotated, and thus the selected file-name or number is maintained. These procedures may be previously announced to users or a message announcing the same may be displayed on the LCD panel 22.

In either case, when the file-designation switch 77 is turned ON, the control proceeds from step 1619 to step 1620, in which it is determined whether or not the change of the selected file-name has been carried out. If the selected file-name has been changed, the control returns from step 1620 to the step 1601, and then the routine is again executed. On the other hand, if the selected file-name has been not changed, the control proceeds from step 1620 to step 1607.

As is apparent from the foregoing, according to the present invention, although the same file-name as a file-name selected by the file-selection switch 75 is not included in the memory-medium of the driver 74, and although the selected file is not the image-file, as long as a loaded electro-developing recording medium RM has been recorded on, by reading the developed image as a single-frame of image data from that recording medium RM, it is possible to transfer the single-frame of image data read out of the recording medium RM to the personal computer.

Figure 18:
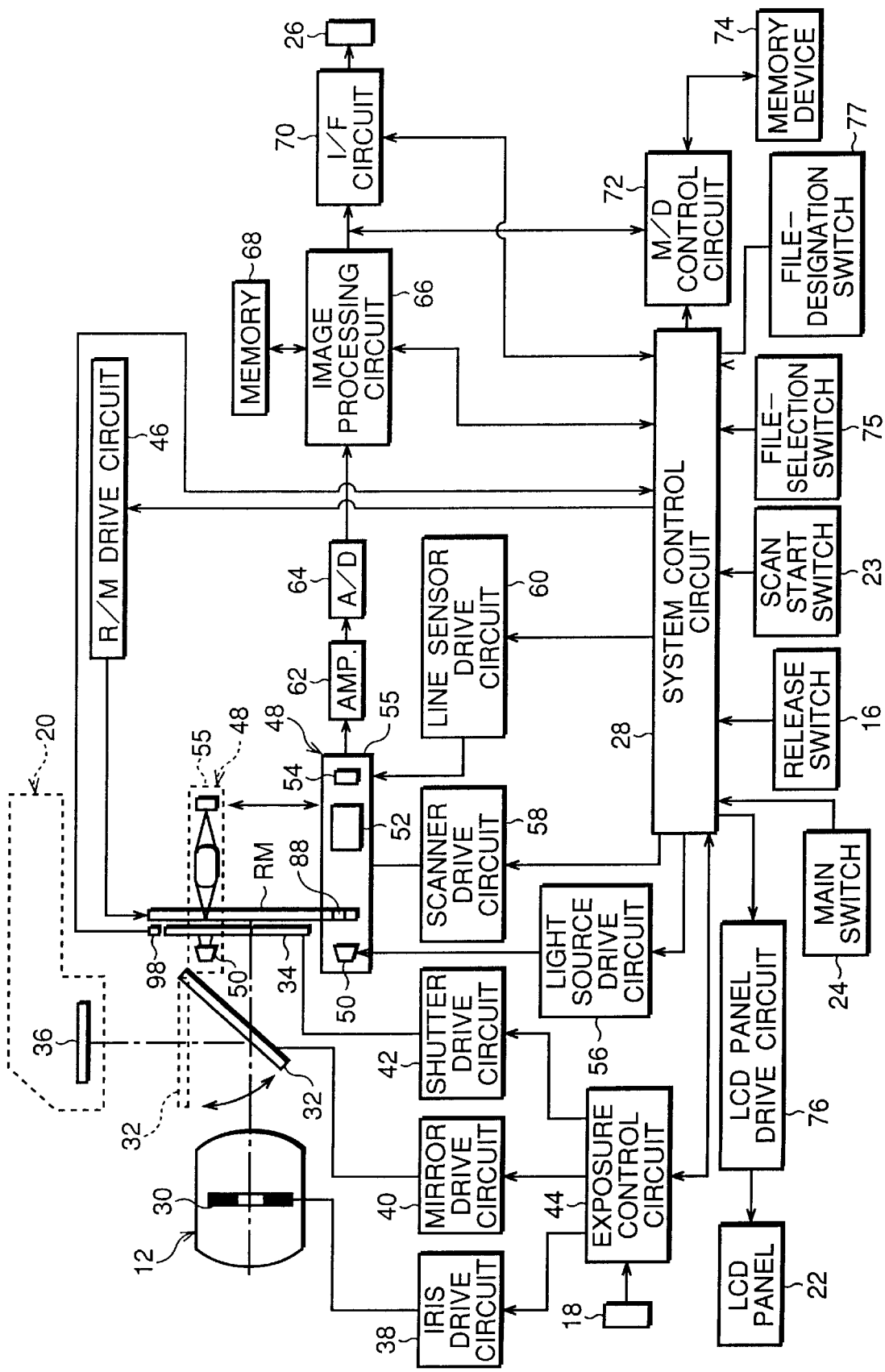
FIG. 18 is a block diagram of the second embodiment of the electro-developing type still video camera according to the present invention.

FIG. 18 shows a block diagram of a second embodiment of the electro-developing type still video camera according to the present invention. This block diagram corresponds to that of FIG. 2 where the light source or LED 90, the optical sensor 92, the LED drive circuit 94, and the amplifier 96 are omitted. Note, the same features used in FIG. 2 are indicated by the same references.

As is apparent from FIG. 18, in the second embodiment, when the image-reader or scanning mechanism 48 is at the lower position or initial position as shown by a solid line, and when an electro-developing recording medium RM is loaded in the camera body 10, the detective area 88 of the recording medium RM is intervened between the light source 50 and the scanner optical system 52. Namely, in this second embodiment, the light source 50 and the CCD line sensor 54 of the image-reader 48 are substituted for the LED 90 and the optical sensor 92 used in the first embodiment.

The camera having the block diagram of FIG. 18 may be operated in accordance with the recording-medium detection routine of FIG. 8, the main routine of FIG. 9 and 10, and the image-data transfer routine of FIG. 16, but the recording-medium determination routine of FIG. 11, and the photographing routine of 12 must be somewhat modified as stated below.

Figure 19:
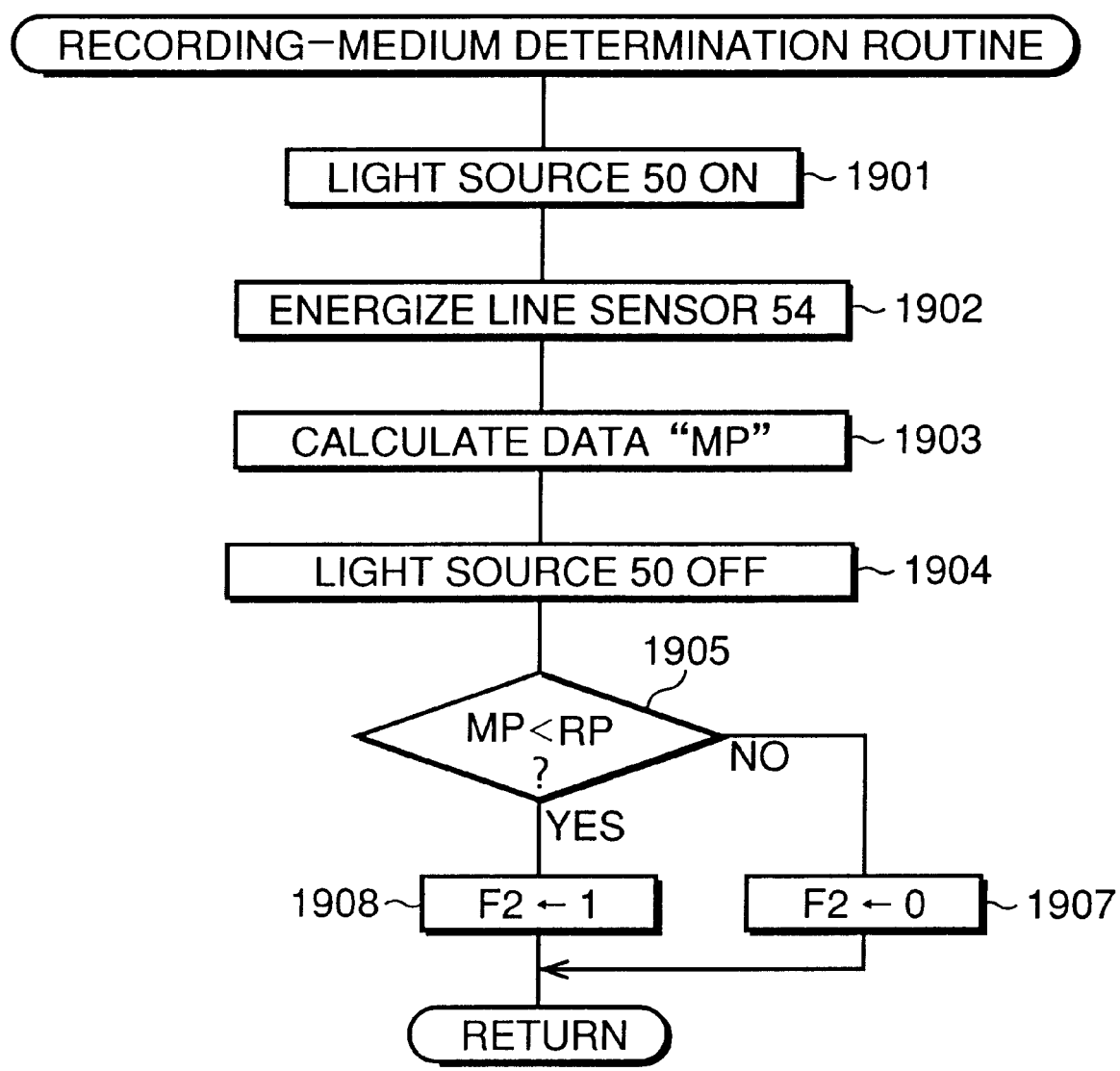
FIG. 19 is a flowchart showing a recording-medium determination routine executed in the second embodiment of the present invention for determining whether the electro-developing recording medium has been recorded.

FIG. 19 shows a flowchart explaining the recording-medium determination routine executed in step 902 of the flowchart shown in FIGS. 9 and 10, upon operating the camera having the block diagram of FIG. 18.

At step 1901, the light source 50 is powered ON by the light source drive circuit 56, and, at step 1902, the line sensor 54 is electrically energized by the CCD line sensor drive circuit 60. Light rays emitted from the light source 50 are transmitted through the detective zone 88 of the recording medium RM, and are then detected by the CCD line sensor 54, resulting in producing electrical signals carrying the transparency information of the detective zone 88. The electrical signals are amplified by the amplifier 62, and are converted into digital data by the analog-digital converter 64.

At step 1903, the converted digital data is fetched by the system control circuit 28, and then transparency data "MP" is calculated on the basis of the fetched digital data.

The calculated transparency data "MP" is temporarily stored in the RAM of the system control circuit 28. Then, at step 1904, the light source 50 is deenergized.

At step 1905, the transparency data "MP" is compared with threshold data "RP", i.e., it is determined whether or not the transparency data "MP" is smaller than the threshold data "RP". As explained with reference to FIG. 11, the threshold data "RP" is stored in the ROM of the system control circuit 28, and corresponds to a level "RL" of the curve A shown in the graph of FIG. 4.

Accordingly, at step 1905, when the transparency data "MP" is smaller than the threshold data "RP", i.e., when the loaded recording medium RM has been not recorded on, the control proceeds from step 1905 to step 1906, in which the flag F2 is made "1". On the other hand, at step 1905, when the transparency data "MP" is larger than the threshold data "RP",i.e., when the loaded recording medium RM has been recorded on, the control proceeds from step 1905 to step 1907, in which the flag F2 is made "0".

Figure 20:
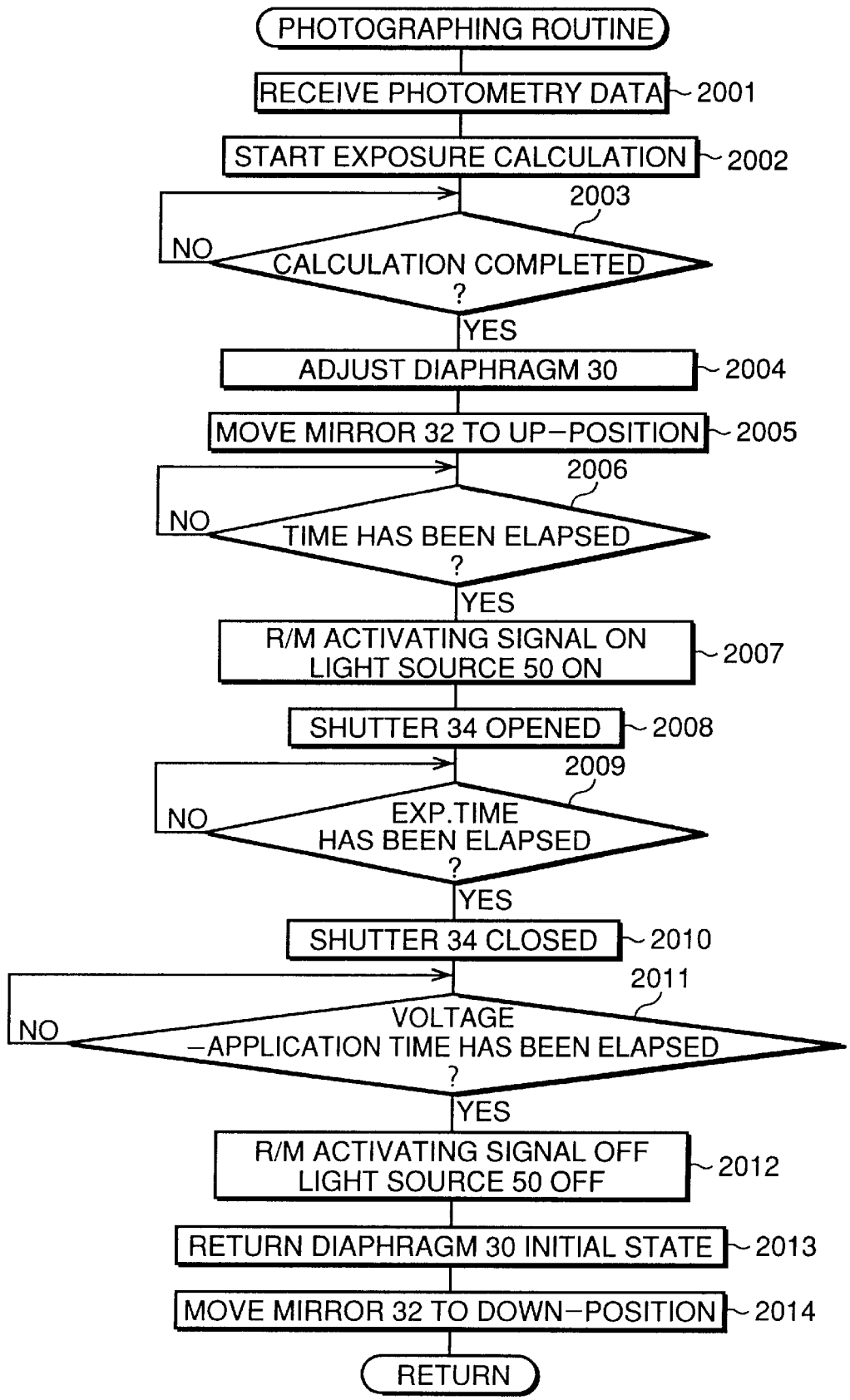
FIG. 20 is a flowchart showing a photographing routine executed in the second embodiment of the present invention.
Figure 21:
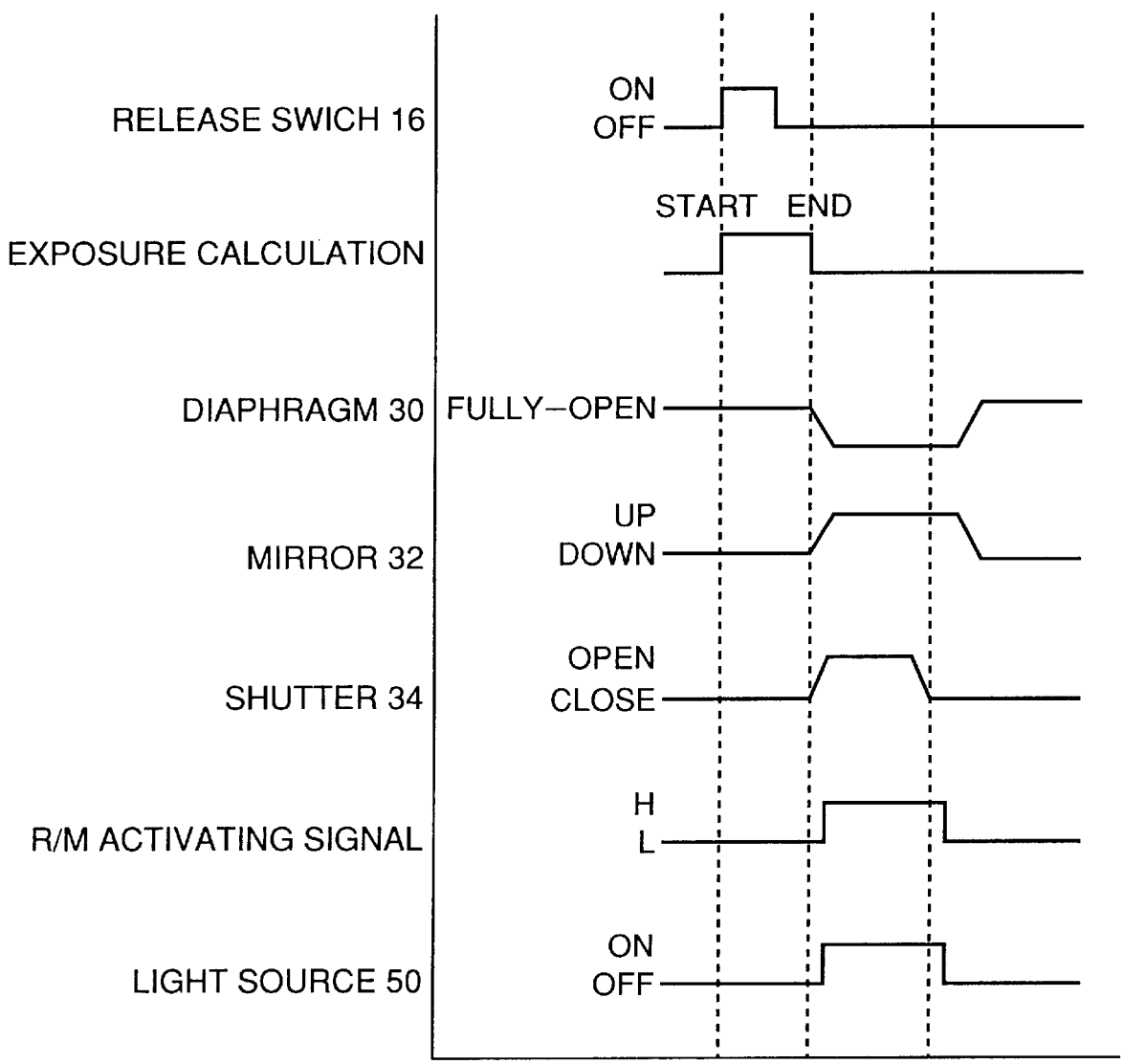
FIG. 21 is a timing chart of the photographing routine of FIG. 20.

FIG. 20 shows a flowchart for the photographing routine executed in step 906 of the flowchart shown in FIGS. 9 and 10, upon operating the camera having the block diagram of FIG. 18, and FIG. 21 shows a timing chart for the photographing routine of FIG. 20. The photographing routine of FIG. 20 i s substantially identical to that of FIG. 12 except for steps 2007 and 2012 of FIG. 20 corresponding to steps 1207 and 1212 of FIG. 12.

Namely, at step 2007, the light source 50 is powered ON by the light source drive circuit 56 at the same time when a recording medium activating signal outputted from the recording medium drive circuit 46 to the electro-developing recording medium RM is turned ON, as shown in the timing chart of FIG. 21. On the other hand, at step 2012, the light source 50 is powered OFF by the light source drive circuit 56 at the same time when a recording medium activating signal outputted from the recording medium drive circuit 46 to the electro-developing recording medium RM is turned OFF, as shown in the timing chart of FIG. 21.

The present invention is not restricted to a single-lens reflex camera as disclosed hereinbefore, but the present invention may be applied to another type camera, such as lens shutter camera. Of course, in the application of the invention to the lens shutter camera, the shutter (34) as used in the above-mentioned embodiments is unnecessary.

In the present invention, a user may be obligated to adhere a detective mark to a predetermined location of the electro-developing recording medium RM whenever it is recorded on. In this case, by detecting the detective mark with a suitable sensor, it is possible to determine whether the recording medium RM concerned has been recorded on or not.

Further, the electro-developing recording medium RM may be provided with a mechanically-removable detective element for determining whether it has been recorded, in which a user is obligated to remove the detective element from the recording medium RM whenever it is recorded. In this case, by detecting the removal of the detective element with a suitable sensor, it is possible to determine whether the recording medium RM concerned has been recorded on or not.

Finally, it will be understood by those skilled in the art that the foregoing description is of preferred embodiments of the disclosed electro-developing type still video camera, and that various changes and modifications may be made to the present invention without departing from the spirit and scope thereof.

The present disclosure relates to subject matter contained in Japanese Patent Application No. 8-52279 (filed on Feb. 15, 1996), which is expressly incorporated herein, by reference, in its entirety.

I claim:

1. An electro-developing type still video camera using an electro-developing recording medium loaded in said still video camera, comprising:

an image-sensor for optically and electronically sensing a developed image as a single-frame of image data from said electro-developing recording medium;

a memory device having a plurality of data-storage sections, the single-frame of image data being stored in any one of said plurality of data-storage sections of said memory device upon sensing the developed image of said electro-developing recording medium by said image-sensor;

a receiver for receiving a command signal from an external processing device to transfer image data from a selected one of said plurality of data-storage sections of said memory device;

a first image-data transferring device which transfers a single-frame of image data from the selected data-storage section of said memory device when such a single-image of data is stored in the selected data-storage section of said memory device; and a second image-data transferring device which transfers a single-frame of image data sensed by said image-sensor to the external processing device when there is no image data in the selected data-storage section of said memory device.

2. An electro-developing type still video camera as set forth in claim 1, further comprising a determiner that determines whether said electro-developing recording medium has been recorded when said electro-developing recording medium is loaded into said still video camera.

3. An electro-developing type still video camera as set forth in claim 2, further comprising a detector that detects whether said electro-developing recording medium is loaded into, or unloaded from said still video camera before the determination by said determiner.

4. An electro-developing type still video camera as set forth in claim 2, wherein said determiner comprises a transparency-sensor for sensing a change of transparency of said electro-developing recording medium to determine whether said electro-developing recording medium has been recorded.

5. An electro-developing type still video camera as set forth in claim 1, further comprising a selector for selecting another of the data-storage sections of said memory device for responding to the request to transfer image data when the image data is not stored in said selected data-storage section.

6. An electro-developing type still video camera as set forth in claim 5, further comprising a determiner that determines whether said electro-developing recording medium has been recorded when loaded into said still video camera.

7. An electro-developing type still video camera as set forth in claim 6, further comprising a detector that detects whether said electro-developing recording medium is loaded into, or unloaded from said still video camera before the determination by said determiner.

8. An electro-developing type still video camera as set forth in claim 6, wherein said determiner comprises a transparency-sensor for sensing a change of transparency of said electro-developing recording medium to determine whether said electro-developing recording medium has been recorded.

9. An electro-developing type still video camera using an electro-developing recording medium loaded in said still video camera, comprising:

image-sensing means for optically and electronically sensing a developed image as a single-frame of image data from said electro-developing recording medium;

memory means having a plurality of data-storage sections, the single-frame of image data being stored in any one of said plurality of data-storage sections of said memory means upon sensing the developed image of said electro-developing recording medium by said image-sensing means;

receiver means for receiving a command signal from an external processing device to transfer image data from a selected one of the data-storage sections of said memory means;

first image-data transferring means for transferring a single-frame of image data from the selected data-storage section of said memory means when such a single-image of data is stored in the selected data-storage section of said memory means; and second image-data transferring means for transferring a single-frame of image data sensed by said image-sensing means to the external processing device when there is no single-frame of image data in the selected data-storage section of said memory means.

10. An electro-developing type still video camera as set forth in claim 9, further comprising determination means for determining whether said electro-developing recording medium has been recorded when loaded into said still video camera.

11. An electro-developing type still video camera as set forth in claim 10, further comprising detection means for detecting whether said electro-developing recording medium is loaded into or unloaded from said still video camera before the determination by said determination means.

12. An electro-developing type still video camera as set forth in claim 10, wherein said determination means comprises a transparency-sensor for sensing a change of transparency of said electro-developing recording medium to determine whether said electro-developing recording medium has been recorded.

13. An electro-developing type still video camera as set forth in claim 9, further comprising selector means for selecting another of the data-storage sections of said memory device and for responding to the request to transfer image data when the image data is not stored in said selected data-storage section.

14. An electro-developing type still video camera as set forth in claim 13, further comprising determination means for determining whether said electro-developing recording medium has been recorded when loaded into said still video camera.

15. An electro-developing type still video camera as set forth in claim 14, further comprising detection means for detecting whether said electro-developing recording medium is loaded into, or unloaded from said still video camera before the determination by said determination means.

16. An electro-developing type still video camera as set forth in claim 14, wherein said determination means comprises a transparency-sensor for sensing a change of transparency of said electro-developing recording medium to determine whether said electro-developing recording medium has been recorded.

17. An electro-developing type still video camera using an electro-developing recording medium loaded in said still video camera, comprising:

an image-sensor for optically and electronically sensing a developed image as a single-frame of image data from said electro-developing recording medium;

a memory device having a plurality of data-storage sections, the single-frame of image data being stored in any one of said data-storage sections of said memory means upon sensing the developed image of said electro-developing recording medium by said image-sensor;

an actuating switch that activates said image-sensor to execute the optical and electronic sensing of the developed image of said electro-developing recording medium;

a receiver that receives a command signal from an external processing device to transfer image data from a selected data-storage section of said memory device; and an actuator that activates said image-sensor to execute the optical and electronic sensing of the developed image of said electro-developing recording medium when said receiver receives the command signal from said external processing device and when no data is stored in the selected data-storage section of said memory device.

18. An electro-developing type still video camera as set forth in claim 17, further comprising an image data transferring device which transfers a single-frame of image data sensed by said image-sensor to said external processing device when said image-sensor is actuated by said actuator.

19. An electro-developing type still video camera as set forth in claim 17, further comprising a determiner that determines whether said electro-developing recording medium has been recorded when loaded in said still video camera.

20. An electro-developing type still video camera as set forth in claim 19, further comprising a detector for detecting whether said electro-developing recording medium is loaded into, or unloaded from said still video camera before the determination by said determiner.

21. An electro-developing type still video camera using an electro-developing recording medium loaded in said still video camera, comprising:

image-sensing means for optically and electronically sensing a developed image as a single-frame of image data from said electro-developing recording medium;

memory means having a plurality of data-storage sections, the single-frame of image data being stored in any one of said plurality of data-storage sections of said memory means upon sensing the developed image of said electro-developing recording medium by said image-sensing means;

actuating-switch means for actuating said image-sensing means to execute the optical and electronic sensing of the developed image of said electro-developing recording medium;

receiver means for receiving a command signal from an external processing device to transfer image data from a selected data-storage section of said memory means; and actuator means for actuating said image-sensing means to execute the optical and electronic sensing of the developed image of said electro-developing recording medium when said receiver means receives the command signal from said external processing device and when image data is not stored in the selected data-storage section of said memory means.

22. An electro-developing type still video camera as set forth in claim 21, further comprising image data transferring means for transferring a single-frame of image data sensed by said image-sensing means to said external processing device when actuating said image-sensing means by said actuator means.

23. An electro-developing type still video camera as set forth in claim 21, further comprising determining means for determining whether said electro-developing recording medium has been recorded when loaded in said still video camera.

24. An electro-developing type still video camera as set forth in claim 23, further comprising detector means for detecting whether said electro-developing recording medium is loaded into, or unloaded from said still video camera before the determination by said determining means.

25. An electro-developing type still video camera using an electro-developing recording medium loaded in said still video camera, comprising:

an image-sensor for optically and electronically sensing a developed image as a single-frame of image data from said electro-developing recording medium;

a memory device having a plurality of data-storage sections, the single-frame of image data being stored in any one of said data-storage sections of said memory device upon sensing the developed image of said electro-developing recording medium by said image-sensor;

a receiver for receiving a command signal from an external processing device to transfer image data from a selected data-storage section of said memory device; and a selector for selecting another of the data-storage sections of said memory device for responding to the command to transfer image data when data stored in the selected data-storage section of said memory device is not image data.

26. An electro-developing type still video camera using an electro-developing recording medium loaded in said still video camera, comprising:

image-sensing means for optically and electronically sensing a developed image as a single-frame of image data from said electro-developing recording medium;

memory means having a plurality of data-storage sections, the single-frame of image data being stored in any one of said plurality of data-storage sections of said memory means upon sensing the developed image of said electro-developing recording medium by said image-sensing means;

receiver means for receiving a command signal from an external processing device to transfer image data from a selected data-storage section of said memory means; and selector means for selecting another of said plurality of data-storage sections of said memory means for responding to the command to transfer image data when data stored in the selected data-storage section of said memory means is not image data.

27. An electro-developing type still video camera using an electro-developing recording medium loaded in said still video camera, comprising:

an image-sensor for optically and electronically sensing a developed image as a single-frame of image data from said electro-developing recording medium;

a memory device having a plurality of data-storage sections, the single-frame of image data being stored in any one of said data-storage sections of said memory device upon sensing the developed image of said electro-developing recording medium by said image-sensor;

a receiver which receives a command signal from an external processing device to transfer image data from a selected data-storage section of said memory device;

a determiner which determines whether data stored in the selected data-storage section of the memory device is image data;

an image-data transferring device which transfers the image data from the selected data-storage section of said memory device to the external processing device when said determiner has determined that the data stored in the selected data-storage section of said memory device is data; and a selector which selects another of the data-storage sections of said memory device for responding to the command to transfer image data when said determiner has determined that the data stored in the selected data-storage section of said memory device is not image data.

28. An electro-developing type still video camera using an electro-developing recording medium loaded in said still video camera, comprising:

image-sensing means for optically and electronically sensing a developed image as a single-frame of image data from said electro-developing recording medium;

memory means having a plurality of data-storage sections, the single-frame of image data being stored in any one of said plurality of data-storage sections of said memory means upon sensing the developed image of said electro-developing recording medium by said image-sensing means;

receiver means for receiving a command signal from an external processing device to transfer image data from a selected data-storage section of said memory means;

determining means for determining whether data stored in the selected data-storage section of the memory means is an image data;

image-data transferring means for transferring the image data from the selected data-storage section of said memory means to the external processing device when said determining means has determined that the data stored in the selected data-storage section of said memory means in image data; and selector means for selecting another of the data-storage sections of said memory means for responding to the command to transfer image data when said determining means has determined that the image data stored in the selected data-storage section of said memory means is not image data.

* * * * *